(12) United States Patent
Wang et al.

(10) Patent No.: US 10,827,407 B2
(45) Date of Patent: Nov. 3, 2020

(54) HANDOVER METHOD, TERMINAL DEVICE, AND NETWORK DEVICE

(71) Applicant: HUAWEI TECHNOLOGIES CO., LTD., Shenzhen, Guangdong (CN)

(72) Inventors: Hong Wang, Beijing (CN); Wei Quan, Beijing (CN); Jian Zhang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/438,804

(22) Filed: Jun. 12, 2019

(65) Prior Publication Data

US 2019/0297551 A1    Sep. 26, 2019

Related U.S. Application Data

(63) Continuation of application No. PCT/CN2016/109963, filed on Dec. 14, 2016.

(51) Int. Cl.
*H04W 36/18* (2009.01)
*H04W 36/08* (2009.01)
(Continued)

(52) U.S. Cl.
CPC ........ *H04W 36/18* (2013.01); *H04W 36/0009* (2018.08); *H04W 36/08* (2013.01); *H04W 8/005* (2013.01)

(58) Field of Classification Search
CPC . H04W 36/18; H04W 36/0009; H04W 36/08; H04W 8/005
See application file for complete search history.

(56) References Cited

U.S. PATENT DOCUMENTS

2012/0302240 A1    11/2012    Tamaki et al.
2014/0286314 A1    9/2014    Xu et al.
(Continued)

FOREIGN PATENT DOCUMENTS

| CN | 103096404 A | 5/2013 |
|---|---|---|
| CN | 103200634 A | 7/2013 |

(Continued)

OTHER PUBLICATIONS

3GPP TR 38.913 V14.0.0; 3rd Generation Partnership Project; Technical Specification Group Radio Access Network; Study on Scenarios and Requirements for Next Generation Access Technologies; (Release 14); Oct. 2016; total 39 pages.

*Primary Examiner* — Marisol Figueroa
(74) *Attorney, Agent, or Firm* — Womble Bond Dickinson (US) LLP

(57) ABSTRACT

Embodiments of this application provide a handover method, a terminal device, and a network device. The method includes: obtaining, by a first terminal device, first identification information, where the first identification information includes identification information of at least one second terminal device; and performing, by the first terminal device, handover of the first terminal device and the at least one second terminal device based on the first identification information, where the handover is handover from a first network device to a second network device. According to the embodiments of this application, impact of signaling on a network side caused by simultaneous handover of a large quantity of terminal devices is reduced, and a service interruption time during handover is reduced, thereby effectively supporting simultaneous handover of a plurality of terminal devices.

18 Claims, 14 Drawing Sheets

(51) Int. Cl.
*H04W 36/00* (2009.01)
*H04W 8/00* (2009.01)

(56) References Cited

U.S. PATENT DOCUMENTS

| | | |
|---|---|---|
| 2015/0139182 A1 | 5/2015 | Dowlatkhah et al. |
| 2015/0296426 A1 | 10/2015 | Mildh et al. |
| 2015/0304911 A1 | 10/2015 | Wang et al. |
| 2015/0358860 A1 | 12/2015 | Lu et al. |
| 2015/0382252 A1 | 12/2015 | Yu et al. |
| 2016/0021594 A1 | 1/2016 | Yilmaz et al. |
| 2016/0198518 A1* | 7/2016 | Baek .............. H04W 24/10 370/329 |
| 2016/0330781 A1* | 11/2016 | Kalhan ............ H04W 36/36 |

FOREIGN PATENT DOCUMENTS

| | | |
|---|---|---|
| CN | 104170468 A | 11/2014 |
| CN | 104662963 A | 5/2015 |
| CN | 104919857 A | 9/2015 |
| CN | 105122886 A | 12/2015 |
| CN | 105611055 A | 5/2016 |
| EP | 2958372 A1 | 12/2015 |
| WO | 2013070246 A1 | 5/2013 |
| WO | 2014/124558 A1 | 8/2014 |

\* cited by examiner

HANDOVER METHOD, TERMINAL DEVICE, AND NETWORK DEVICE

CROSS-REFERENCE TO RELATED APPLICATIONS

This application is a continuation of International Application No. PCT/CN2016/109963, filed on Dec. 14, 2016, the disclosure of which is hereby incorporated by reference in its entirety.

TECHNICAL FIELD

This application relates to the communications field, and more specifically, to a handover method, a terminal device, and a network device.

BACKGROUND

Mobile communications not only aims at a maximum capacity but also requires a wider coverage range. Communications network coverage needs to be available regardless of a location to which a terminal device moves. Bell Laboratories® in the United States proposes a concept of cellular networking to address limited frequency resources, increase a system capacity, and extend a network coverage range. In the cellular networking, one mobile communications service area is divided into many coverage areas whose basic geometric figures are regular hexagons. The coverage areas are referred to as cellular cells. One transmitter with relatively low power serves one cellular cell. A quantity of terminal devices are disposed in a relatively small area. Actually, not all terminal devices can complete all connection services in one cellular cell. To ensure service continuity, when a terminal device that is being served enters a neighboring radio cell, a mobile communications system needs to provide an inter-cell handover function of automatically switching service communication to a base station of the neighboring cell, that is, to a new cell, thereby ensuring continuity of a communication process.

Handover is a process of switching a wireless connection link for communication from one cell to another cell during mobile communication, without interrupting the communication. During a call, when a user moves from a coverage area of a base station to a coverage area of another base station, or when communication quality is degraded due to external interference or another cause, a terminal device sends a measurement report to a current cell, so that the terminal device is handed over to the another base station to ensure normal communication.

There are two handover connection establishment methods depending on different manners of exchanging handover-related information between a terminal device and a network. In other words, different methods cause different connection establishment manners and different handover signaling processes. Therefore, there are two different handover mechanisms: forward handover and backward handover. However, with popularization and massive distribution of terminal devices, a plurality of similar terminal devices use a same handover procedure during handover. This increases signaling overheads of a network and affects power consumption of a terminal device.

SUMMARY

Embodiments of this application provide a handover method, a terminal device, and a network device, so as to effectively support simultaneous handover of a plurality of terminal devices.

According to a first aspect, a handover method is provided, including: obtaining, by a first terminal device, first identification information, where the first identification information includes identification information of at least one second terminal device; and performing, by the first terminal device, handover of the first terminal device and the at least one second terminal device based on the first identification information, where the handover is handover from a first network device to a second network device.

In this embodiment of this application, before the handover, the first terminal device collaborates with the second terminal device to generate a handover group. The first terminal device assists the at least one second terminal device in completing a handover process. This can reduce impact of signaling on a network side caused by simultaneous handover of a large quantity of terminal devices, and reduce a service interruption time during handover.

With reference to the first aspect, in a first implementation of the first aspect, the performing, by the first terminal device, handover of the first terminal device and the at least one second terminal device based on the first identification information includes: sending, by the first terminal device, first handover assistance information to the first network device, where the first handover assistance information includes identification information of the first terminal device and the identification information of the at least one second terminal device; receiving, by the first terminal device, first handover indication information sent by the first network device, where the first handover indication information includes configuration information of the first terminal device and configuration information of the at least one second terminal device; and performing, by the first terminal device, handover from the first network device to the second network device based on the first handover indication information, and assisting, based on the first handover indication information, in handing over the at least one second terminal device from the first network device to the second network device.

In some implementations, the configuration information of the first terminal device and the configuration information of the at least one second terminal device are compressed, to reduce a size of the configuration information.

In some implementations, the second network device allocates a random access resource to the first terminal device, for the first terminal device to initiate a first random access request to the second network device.

With reference to the first implementation of the first aspect, in a second implementation of the first aspect, the performing, by the first terminal device, handover from the first network device to the second network device based on the first handover indication information, and assisting, based on the first handover indication information, in handing over the at least one second terminal device from the first network device to the second network device includes: sending, by the first terminal device, a first random access request to the second network device based on the configuration information of the first terminal device; receiving, by the first terminal device, a first random access response sent by the second network device, where the first random access response includes a first uplink timing advance, and the first uplink timing advance is used by the first terminal device and the at least one second terminal device to send uplink signals; and sending, by the first terminal device, second handover indication information to the at least one second terminal device, where the second handover indication information includes the first uplink timing advance and the configuration information of the at least one second terminal device.

With reference to the second implementation of the first aspect, in a third implementation of the first aspect, the first handover indication information further includes uplink resource allocation information of the first terminal device and the at least one second terminal device, or the first random access response further includes uplink resource allocation information of the first terminal device and the at least one second terminal device.

With reference to the first implementation of the first aspect, in a fourth implementation of the first aspect, the performing, by the first terminal device, handover from the first network device to the second network device based on the first handover indication information, and assisting, based on the first handover indication information, in handing over the at least one second terminal device from the first network device to the second network device includes: sending, by the first terminal device, second handover indication information to the at least one second terminal device, where the second handover indication information includes the configuration information of the at least one second terminal device, and the configuration information of the at least one second terminal device is used by the at least one second terminal device to send a second random access request to the second network device; sending, by the first terminal device, a first random access request to the second network device based on the configuration information of the first terminal device; and receiving, by the first terminal device, a first random access response sent by the second network device, where the first random access response includes an uplink timing advance of the first terminal device.

In some implementations, the configuration information of the first terminal device and the configuration information of the at least one second terminal device are compressed, to reduce a size of the configuration information.

With reference to the fourth implementation of the first aspect, in a fifth implementation of the first aspect, the first handover indication information further includes uplink resource allocation information of the first terminal device and the at least one second terminal device, and the second handover indication information further includes uplink resource allocation information of the at least one second terminal device; or the first random access response further includes uplink resource allocation information of the first terminal device, and an uplink timing advance and uplink resource allocation information of the at least one second terminal device are included in a second random access response sent by the second network device.

With reference to the first aspect, in a sixth implementation of the first aspect, the performing, by the first terminal device, handover of the first terminal device and the at least one second terminal device based on the first identification information includes: performing, by the first terminal device, handover from the first network device to the second network device; sending, by the first terminal device, a first handover request to the second network device, where the first handover request includes the identification information of the at least one second terminal device; receiving, by the first terminal device, third handover indication information sent by the second network device, where the third handover indication information includes configuration information of the at least one second terminal device; and assisting, by the first terminal device based on the third handover indication information, in handing over the at least one second terminal device from the first network device to the second network device.

With reference to the sixth implementation of the first aspect, in a seventh implementation of the first aspect, the third handover indication information further includes uplink resource allocation information of the at least one second terminal device; and the assisting, by the first terminal device based on the third handover indication information, in handing over the at least one second terminal device from the first network device to the second network device includes: sending, by the first terminal device, second handover indication information to the at least one second terminal device, where the second handover indication information includes the configuration information of the at least one second terminal device, the uplink resource allocation information of the at least one second terminal device and an uplink timing advance of the first terminal device, and the uplink timing advance of the first terminal device is used by the at least one second terminal device to send an uplink signal.

With reference to the sixth implementation of the first aspect, in an eighth implementation of the first aspect, the assisting, by the first terminal device based on the third handover indication information, in handing over the at least one second terminal device from the first network device to the second network device includes: sending, by the first terminal device, second handover indication information to the at least one second terminal device, where the second handover indication information includes the configuration information of the at least one second terminal device, and the configuration information of the at least one second terminal device is used by the at least one second terminal device to send a second random access request to the second network device.

With reference to the eighth implementation of the first aspect, in a ninth implementation of the first aspect, the third handover indication information further includes uplink resource allocation information of the at least one second terminal device, and the second handover indication information further includes the uplink resource allocation information of the at least one second terminal device; or an uplink timing advance and uplink resource allocation information of the at least one second terminal device are included in a second random access response sent by the second network device.

With reference to any one of the sixth to the ninth implementations of the first aspect, in a tenth implementation of the first aspect, before the performing, by the first terminal device, handover from the first network device to the second network device, the method further includes: sending, by the first terminal device, first handover assistance information to the first network device, where the first handover assistance information includes identification information of the first terminal device and the identification information of the at least one second terminal device, and the first handover assistance information is used to indicate that the first terminal device is to perform group handover.

With reference to any one of the first aspect, or the first to the tenth implementations of the first aspect, in an eleventh implementation of the first aspect, the method further includes: receiving, by the first terminal device, group handover support indication information sent by the first network device, where the group handover support indication information is used to indicate that the first network device supports a group handover operation.

With reference to any one of the first aspect, or the first to the eleventh implementations of the first aspect, in a twelfth implementation of the first aspect, the obtaining, by a first terminal device, first identification information includes: sending, by the first terminal device, a discovery message, where the discovery message is used to indicate that the first terminal device is to be handed over; and receiving, by the first terminal device, a second handover request sent by the at least one second terminal device, where the second handover request includes the identification information of the at least one second terminal device.

With reference to the twelfth implementation of the first aspect, in a thirteenth implementation of the first aspect, the method further includes: sending, by the first terminal device, a feedback message to the at least one second terminal device, where the feedback message is used to indicate whether the second handover request is accepted.

With reference to any one of the first aspect, or the first to the thirteenth implementations of the first aspect, in a fourteenth implementation of the first aspect, the first terminal device obtains the first identification information if the first terminal device determines that a predefined event occurs.

With reference to the fourteenth implementation of the first aspect, in a fifteenth implementation of the first aspect, that the first terminal device determines that a predefined event occurs includes: the first terminal device determines that the following first predefined event occurs: Mn>Ms+Offset1−Offset2, where Mn is a measurement result obtained by measuring a signal sent by the second network device, Ms is a measurement result obtained by measuring a signal sent by the first network device, Offset1 is a first preset offset, and Offset2 is a second preset offset; or the first terminal device determines that the following second predefined event occurs: Mn>Ms+Offset1, where Mn is a measurement result obtained by measuring a signal sent by the second network device, Ms is a measurement result obtained by measuring a signal sent by the first network device, and Offset1 is a first preset offset.

According to a second aspect, handover method is provided, including: receiving, by a second terminal device, a discovery message sent by a first terminal device, where the discovery message is used to indicate that the first terminal device is to be handed over from a first network device to a second network device; and sending, by the second terminal device, a second handover request to the first terminal device based on the discovery message, where the second handover request includes identification information of the second terminal device, and the identification information of the second terminal device is used by the first terminal device to hand over the first terminal device and at least one second terminal device from the first network device to the second network device.

With reference to the second aspect, in a first implementation of the second aspect, the method further includes: receiving, by the second terminal device, a feedback message sent by the first terminal device, where the feedback message is used to indicate whether the second handover request is accepted.

With reference to the second aspect or the first implementation of the second aspect, in a second implementation of the second aspect, the method further includes: receiving, by the second terminal device, second handover indication information sent by the first terminal device, where the second handover indication information includes configuration information of the at least one second terminal device; sending, by the second terminal device, a second random access request to the second network device based on the configuration information of the at least one second terminal device; and receiving, by the second terminal device, a second random access response sent by the second network device, where the second random access response includes an uplink timing advance of the second terminal device.

With reference to the second implementation of the second aspect, in a third implementation of the second aspect, the second handover indication information further includes uplink resource allocation information of the second terminal device; or the second random access response further includes uplink resource allocation information of the second terminal device.

With reference to the second aspect or the first implementation of the second aspect, in a fourth implementation of the second aspect, the method further includes: receiving, by the second terminal device, second handover indication information sent by the first terminal device, where the second handover indication information includes configuration information of the at least one second terminal device, and uplink resource allocation information and a first uplink timing advance of the second terminal device, and the first uplink timing advance is used by the second terminal device to send an uplink signal.

According to a third aspect, a handover method is provided, including: receiving, by a first network device, first handover assistance information sent by a first terminal device, where the first handover assistance information includes identification information of the first terminal device and identification information of at least one second terminal device; sending, by the first network device, a third handover request message to a second network device based on the first handover assistance information, where the third handover request message includes the identification information and context information of the first terminal device and the at least one second terminal device; receiving, by the first network device, a handover request response message sent by the second network device, where the handover request response message includes configuration information of the first terminal device and the at least one second terminal device; and sending, by the first network device, first handover indication information to the first terminal device, where the first handover indication information includes the configuration information of the first terminal device and the at least one second terminal device, and the first handover indication information is used for handing over the first terminal device and the at least one second terminal device from the first network device to the second network device.

With reference to the third aspect, in a first implementation of the third aspect, the handover request response message and the first handover indication information further include uplink resource allocation information of the first terminal device and the at least one second terminal device.

According to a fourth aspect, a handover method is provided, including: receiving, by a second network device, a third handover request message sent by a first network device, where the third handover request message includes identification information and context information of a first terminal device and at least one second terminal device; and sending, by the second network device, a handover request response message to the first network device, where the handover request response message includes configuration information of the first terminal device and the at least one second terminal device, and the handover request response message is used for handing over the first terminal device and the at least one second terminal device from the first network device to the second network device.

With reference to the fourth aspect, in a first implementation of the fourth aspect, the method further includes: receiving, by the second network device, a first random access request sent by the first terminal device; and sending, by the second network device, a first random access response to the first terminal device, where the first random access response includes a first uplink timing advance, and the first uplink timing advance is used by the first terminal device and the at least one second terminal device to send uplink signals.

With reference to the first implementation of the fourth aspect, in a second implementation of the fourth aspect, the handover request response message further includes uplink resource allocation information of the first terminal device and the at least one second terminal device, or the first random access response further includes uplink resource allocation information of the first terminal device and the at least one second terminal device.

With reference to the fourth aspect, in a third implementation of the fourth aspect, the method further includes: receiving, by the second network device, a first random access request sent by the first terminal device; sending, by the second network device, a first random access response to the first terminal device, where the first random access response includes an uplink timing advance of the first terminal device; receiving, by the second network device, a second random access request sent by the at least one second terminal device; and sending, by the second network device, a second random access response to the at least one second terminal device, where the second random access response includes an uplink timing advance of the at least one second terminal device.

With reference to the third implementation of the fourth aspect, in a fourth implementation of the fourth aspect, the handover request response message further includes uplink resource allocation information of the first terminal device and the at least one second terminal device; or the first random access response further includes uplink resource allocation information of the first terminal device, and the second random access response further includes uplink resource allocation information of the at least one second terminal device.

According to a fifth aspect, a tracking area update method is provided, including: obtaining, by a first terminal device, first identification information, where the first identification information includes identification information of at least one second terminal device, and the second terminal device needs to perform a tracking area update; and performing, by the first terminal device, the tracking area update for the first terminal device and the at least one second terminal device based on the first identification information, where the tracking area update is changing from a first tracking area to a second tracking area.

With reference to the fifth aspect, in a first implementation of the fifth aspect, the obtaining, by a first terminal device, first identification information includes: sending, by the first terminal device, a discovery message, where the discovery message is used to indicate that the first terminal device prepares to perform the tracking area update; and receiving, by the first terminal device, a tracking area update request message sent by the at least one second terminal device, where the tracking area update request message includes the identification information of the at least one second terminal device.

With reference to the fifth aspect or the first implementation of the fifth aspect, in a second implementation of the fifth aspect, the performing, by the first terminal device, the tracking area update for the first terminal device and the at least one second terminal device based on the first identification information includes: sending, by the first terminal device, a first update request message to a network side, where the first update request message includes identification information of the first terminal device and the identification information of the at least one second terminal device, and the first update request message is used by the network side to perform the tracking area update for the first terminal device and the at least one second terminal device; receiving, by the first terminal device, a first acknowledgement message sent by the network side, where the first acknowledgement message includes an identity of the second tracking area; and sending, by the first terminal device, a second acknowledgement message to the at least one second terminal device, where the second acknowledgement message includes the identity of the second tracking area.

According to a sixth aspect, a terminal device is provided, configured to perform the method according to any one of the first aspect or the implementations of the first aspect. The terminal device includes modules or units configured to perform the method according to any one of the first aspect or the implementations of the first aspect.

According to a seventh aspect, a terminal device is provided, configured to perform the method according to any one of the second aspect or the implementations of the second aspect. The terminal device includes modules or units configured to perform the method according to any one of the second aspect or the implementations of the second aspect.

According to an eighth aspect, a network device is provided, configured to perform the method according to any one of the third aspect or the implementations of the third aspect. The network device includes modules or units configured to perform the method according to any one of the third aspect or the implementations of the third aspect.

According to a ninth aspect, a network device is provided, configured to perform the method according to any one of the fourth aspect or the implementations of the fourth aspect. The network device includes modules or units configured to perform the method according to any one of the fourth aspect or the implementations of the fourth aspect.

According to a tenth aspect, a terminal device is provided, configured to perform the method according to any one of the fifth aspect or the implementations of the fifth aspect. The terminal device includes modules or units configured to perform the method according to any one of the fifth aspect or the implementations of the fifth aspect.

According to an eleventh aspect, a terminal device is provided. The terminal device includes a processor, a memory, a receiver, and a transmitter. The memory is configured to store an instruction. The processor is configured to: execute the instruction stored in the memory, control the receiver to receive a signal, and control the transmitter to send a signal.

The processor is configured to execute the instruction stored in the memory, to perform operations in the method according to any one of the first aspect or the implementations of the first aspect.

According to a twelfth aspect, a terminal device is provided. The terminal device includes a processor, a memory, a receiver, and a transmitter. The memory is configured to store an instruction. The processor is configured to: execute the instruction stored in the memory, control the receiver to receive a signal, and control the transmitter to send a signal.

The processor is configured to execute the instruction stored in the memory, to perform operations in the method according to any one of the second aspect or the implementations of the second aspect.

According to a thirteenth aspect, a network device is provided. The network device includes a processor, a memory, a receiver, and a transmitter. The memory is configured to store an instruction. The processor is configured to: execute the instruction stored in the memory, control the receiver to receive a signal, and control the transmitter to send a signal.

The processor is configured to execute the instruction stored in the memory, to perform operations in the method according to any one of the third aspect or the implementations of the third aspect.

According to a fourteenth aspect, a network device is provided. The network device includes a processor, a memory, a receiver, and a transmitter. The memory is configured to store an instruction. The processor is configured to: execute the instruction stored in the memory, control the receiver to receive a signal, and control the transmitter to send a signal.

The processor is configured to execute the instruction stored in the memory, to perform operations in the method according to any one of the fourth aspect or the implementations of the fourth aspect.

According to a fifteenth aspect, a terminal device is provided. The terminal device includes a processor, a memory, a receiver, and a transmitter. The memory is configured to store an instruction. The processor is configured to: execute the instruction stored in the memory, control the receiver to receive a signal, and control the transmitter to send a signal.

The processor is configured to execute the instruction stored in the memory, to perform operations in the method according to any one of the fifth aspect or the implementations of the fifth aspect.

According to a sixteenth aspect, a computer readable medium is provided, configured to store a computer program. The computer program includes an instruction used to perform the method according to any one of the first aspect or the implementations of the first aspect, any one of the second aspect or the implementations of the second aspect, any one of the third aspect or the implementations of the third aspect, any one of the fourth aspect or the implementations of the fourth aspect, or any one of the fifth aspect or the implementations of the fifth aspect.

DESCRIPTION OF EMBODIMENTS

The following describes technical solutions in embodiments of this application with reference to accompanying drawings.

Figure 1A:
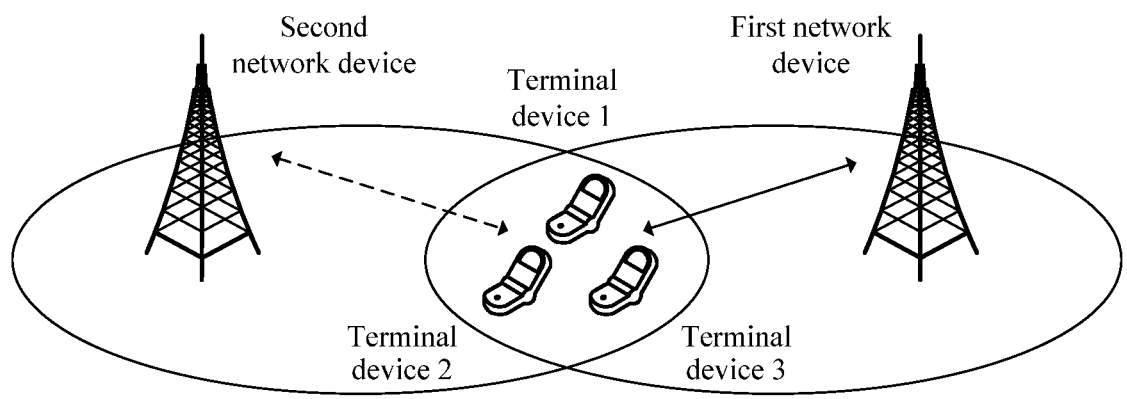
FIG. 1A is a schematic diagram of a scenario to which a technical solution in an embodiment of this application is applied.

FIG. 1A is a schematic diagram of a scenario to which a technical solution in an embodiment of this application is applied. As shown in FIG. 1A, a terminal device 1, a terminal device 2, and a terminal device 3 are connected to a first network device. The terminal device 1, the terminal device 2, and the terminal device 3 move in a same direction, and therefore need to be simultaneously handed over from the first network device to a second network device.

A codirectional movement scenario may be, but is not limited to, a high-speed railway scenario. A same handover procedure is performed when a large quantity of terminal devices are handed over between cells. In this case, impact of signaling on a network is relatively large. In this case, if a plurality of terminal devices collaborate with each other, and one terminal device assists in handing over several terminal devices, the impact of signaling on the network can be reduced.

Figure 1B:
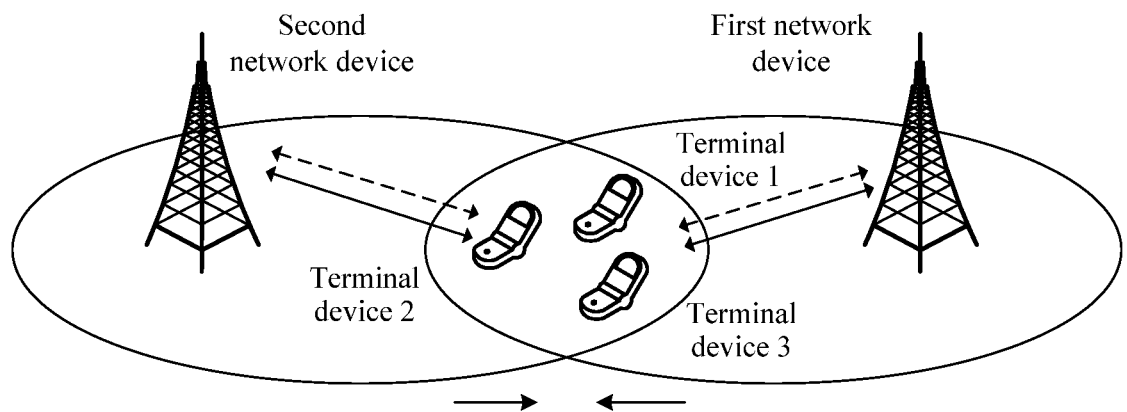
FIG. 1B is a schematic diagram of another scenario to which a technical solution in an embodiment of this application is applied.

In a low-speed scenario, codirectional movement or contradirectional movement may be performed. For example, a place with densely distributed terminal devices, for example, a subway station, a railway station, or a commercial district, is relatively densely populated. Small cells are usually deployed, a radius of a cell is small, and a terminal device is handed over relatively frequently. In this case, if one terminal device can assist in handing over a plurality of terminal devices, impact of signaling on a network can be reduced. FIG. 1B is a schematic diagram of another scenario to which a technical solution in an embodiment of this application is applied. A terminal device 2 moves from left to right, and needs to be handed over from a second network device to a first network device. A terminal device 1 and a terminal device 3 move from right to left, and need to be handed over from the first network device to the second network device.

It is understood that, in FIG. 1A and FIG. 1B, only three terminal devices are used as an example for description, but this application is not limited thereto, and the scenario may further include more terminal devices. It is further understood that the terminal devices may be terminal devices of a same type, for example, all the terminal devices are user equipments; or may be terminal devices of different types, for example, the terminal device 1 is a cellular phone, the terminal device 2 is a computing device, and the terminal device 3 is an in-vehicle device. This application is not limited thereto.

It is further understood that the technical solutions in the embodiments of this application may be applied to various communications systems, for example, a Global System for Mobile Communications (GSM) system, a Code Division Multiple Access (CDMA) system, a Wideband Code Division Multiple Access (WCDMA) system, a Long Term Evolution (LTE) system, an LTE Frequency Division Duplex (FDD) system, an LTE Time Division Duplex (TDD) system, Universal Mobile Telecommunications System (UMTS), and a future 5th Generation (5G) communications system.

This application describes the embodiments with reference to a terminal device. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in a future 5G network, a terminal device in a future evolved public land mobile network (PLMN), or the like.

This application describes the embodiments with reference to a network device. The network device may be a device configured to communicate with a terminal device. For example, the network device may be a combination of a base transceiver station (BTS) and a base station controller (BSC) in a GSM system or a CDMA system, or may be a combination of a NodeB (NB) and a radio network controller (RNC) in a WCDMA system, or may be an evolved NodeB (eNB) in an LTE system. Alternatively, the network device may be a relay station, an access point, an in-vehicle device, a wearable device, an access network device in a future 5G network, such as a next-generation base station, or an access network device in a future evolved PLMN.

Figure 2:
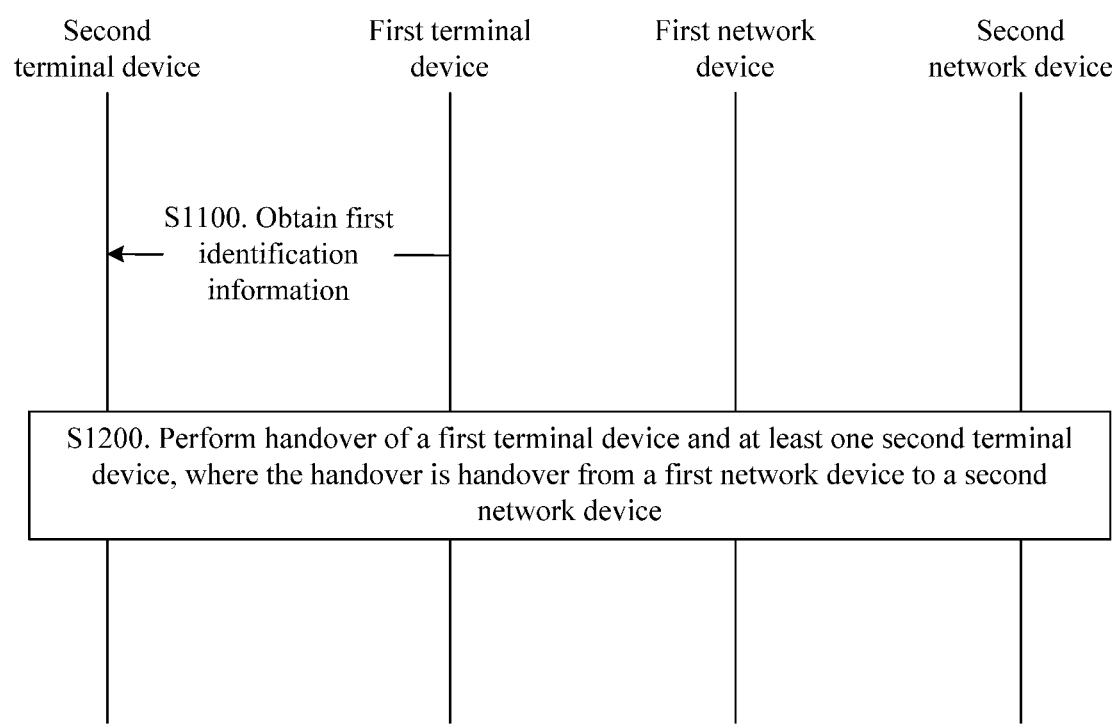
FIG. 2 is a schematic flowchart of a handover method according to an embodiment of this application.

FIG. 2 is a schematic flowchart of a handover method according to an embodiment of this application. In FIG. 2, a first network device may be the first network device in FIG. 1, a second network device may be the second network device in FIG. 1, a first terminal device may be the terminal device 1 in FIG. 1, and a second terminal device may be the terminal device 2 and the terminal device 3 in FIG. 1. In an actual system, a quantity of terminal devices may be not limited to the example in this embodiment of this application. Details are not described below again.

S1100. The first terminal device obtains first identification information, where the first identification information includes identification information of at least one second terminal device.

Optionally, the following operations may be performed to trigger the first terminal device to obtain the first identification information.

S1001. The first terminal device obtains the first identification information when a predefined event occurs.

Optionally, in this embodiment of this application, the obtaining the first identification information may be triggered by an existing predefined event, or may be triggered by a new predefined event. The following provides descriptions separately.

Optionally, a first predefined event that triggers the first terminal device to obtain the first identification information may be as follows:

$$Mn > Ms + \text{Offset1} \quad (1)$$

where Mn is a measurement result obtained by measuring, by the first terminal device, a signal sent by the second network device, Ms is a measurement result obtained by measuring, by the first terminal device, a signal sent by the first network device, and Offset1 is a first preset offset.

The first terminal device measures reference signals sent by the first network device and the second network device. The measurement includes reference signals received power (RSRP) measurement, reference signals received quality (RSRQ) measurement, or signal to interference plus noise ratio (SINR) measurement. Results obtained by measuring, by the first terminal device, the reference signals sent by the first network device and the second network device are a first measurement value and a second measurement value. The first measurement value is denoted as Ms, and the second measurement value is denoted as Mn. When the measurement results of the first terminal device satisfy the first predefined event (1), the first terminal device obtains the first identification information. The first predefined event (1) may be an A3 event. The A3 event is that a difference between the second measurement value and the first measurement value is greater than the first preset offset.

Optionally, a second predefined event that triggers the first terminal device to obtain the first identification information may be as follows:

$$Mn > Ms + \text{Offset1} - \text{Offset2} \quad (2)$$

where Mn is a measurement result obtained by measuring, by the first terminal device, a signal sent by the second network device, Ms is a measurement result obtained by measuring, by the first terminal device, a signal sent by the first network device, Offset1 is a first preset offset, and Offset2 is a second preset offset.

The first terminal device measures reference signals sent by the first network device and the second network device. The measurement includes an RSRQ measurement or an SINR measurement. Results obtained by measuring, by the first terminal device, the reference signals sent by the first network device and the second network device are a first measurement value and a second measurement value. The first measurement value is denoted as Ms, and the second measurement value is denoted as Mn. When the measurement results of the first terminal device satisfy the second predefined event (2), the first terminal device obtains the first identification information. The second predefined event (2) is that a difference between the second measurement value and the first measurement value is greater than a difference between the first preset offset and the second preset offset. The second preset offset is less than the first preset offset.

It is understood that, in the prior art, the first predefined event (1) is used to trigger measurement reporting, so as to perform cell handover. In this solution, the first predefined event (1) may be used to trigger the obtaining the first identification information, and a timer is set to delay triggering measurement reporting. Before the first predefined event (1) is triggered, the second predefined event (2) may trigger the obtaining the first identification information. Then measurement reporting is triggered when the first predefined event (1) is satisfied.

It is understood that the obtaining the first identification information may be triggered by the first predefined event (1) or the second predefined event (2), or may be triggered by another event. This application is not limited thereto.

S1200. The first terminal device performs handover of the first terminal device and the at least one second terminal device based on the first identification information, where the handover is handover from the first network device to the second network device.

The first terminal device performs handover of the first terminal device and the at least one second terminal device from the first network device to the second network device based on the first identification information. The first identification information includes identification information of the first terminal device and the identification information of the at least one second terminal device.

It is understood that the first terminal device and the at least one second terminal device may be simultaneously handed over from the first network device to the second network device; or the first terminal device may be first handed over from the first network device to the second network device, and then assist in handing over the at least one second terminal device from the first network device to the second network device.

Figure 3:
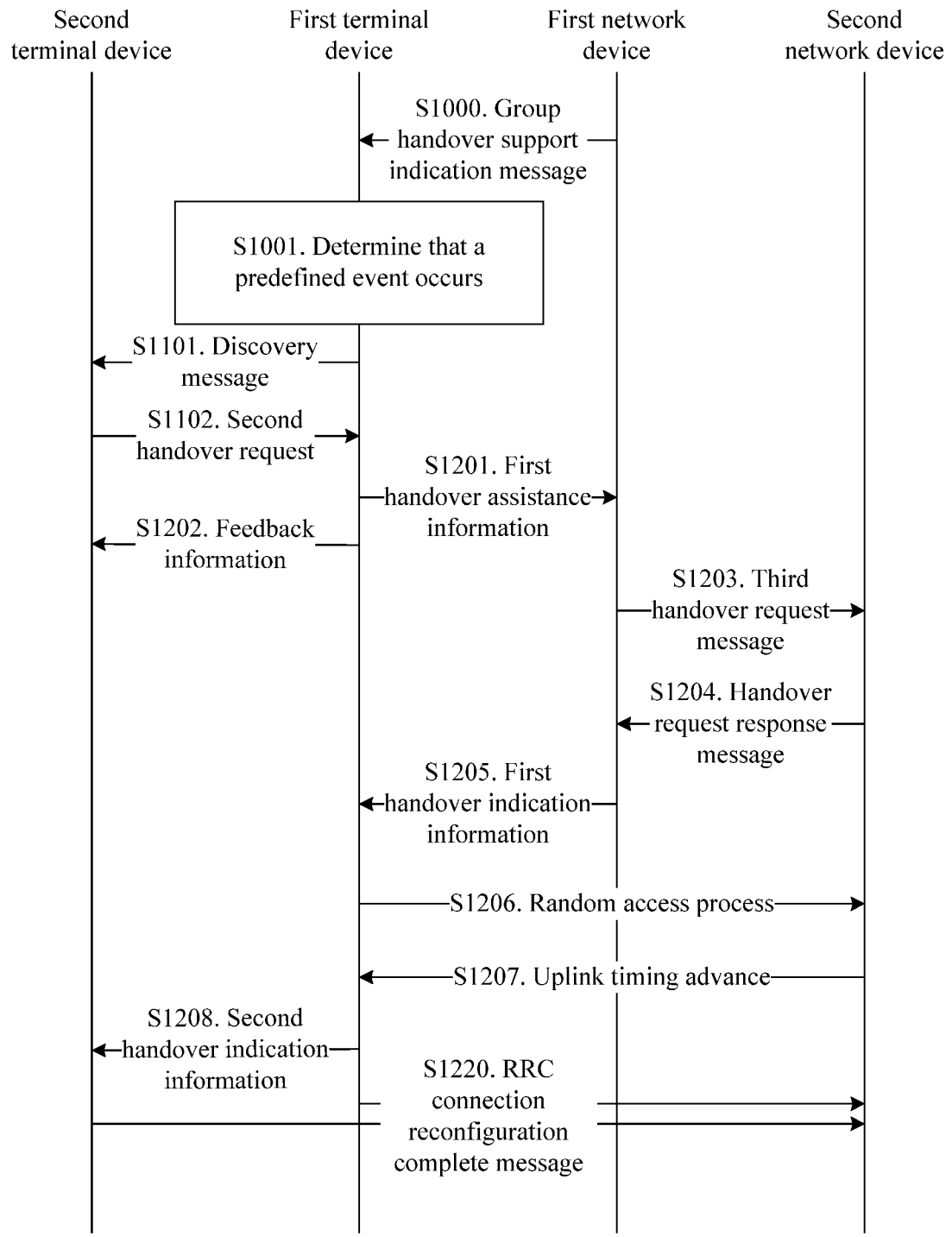
FIG. 3 is another schematic flowchart of a handover method according to an embodiment of this application.

FIG. 3 is another schematic flowchart of a handover method according to an embodiment of this application.

Optionally, as shown in FIG. 3, operation S1000 may be alternatively performed before operation S1001.

S1000. A first terminal device receives group handover support indication information sent by a first network device, where the group handover support indication information is used to indicate that the first network device supports a group handover operation.

Optionally, the group handover support indication information may further include configuration information for triggering handover, for example, Offset1 or Offset2.

Optionally, as shown in FIG. 3, the first terminal device may obtain first identification information by using the following operations.

S1101. The first terminal device sends a discovery message, where the discovery message is used to indicate that the first terminal device is to be handed over from the first network device to a second network device.

Optionally, the discovery message further includes first indication information. The first indication information is used to indicate that the first terminal device is triggered by a second predefined event (2) to send the discovery message, and imply that the first terminal device is to trigger a first predefined event (1), that is, is to be handed over from the first network device to the second network device.

Optionally, the discovery message further includes identification information of the first network device. The identification information of the first network device is used by the second terminal device to identify whether the first terminal device and the second terminal device belong to a same first network device.

Optionally, the discovery message further includes second indication information. The second indication information is used by the first terminal device to perform handover.

Optionally, the discovery message further includes identification information of the second network device. The identification information of the second network device is used by the second terminal device to determine whether the first terminal device and the second terminal device are to be handed over to a same second network device.

Optionally, the discovery message further includes an identity of a serving cell of the first terminal device. The identity of the serving cell is used by the second terminal device to identify whether the first terminal device and the second terminal device belong to a same serving cell.

Optionally, the discovery message further includes an identity of a target cell of the first terminal device. The target cell is a cell to which the first terminal device is to be handed over. The identity of the target cell is used by the second terminal device to determine whether the first terminal device and the second terminal device are to be handed over to a same target cell.

S1102. A second terminal device sends a second handover request to the first terminal device, where the second handover request includes identification information of the second terminal device, and the identification information of the second terminal device is used by the first terminal device to hand over the first terminal device and at least one second terminal device from the first network device to the second network device.

Optionally, the identification information of the second terminal device may be one of the following: a cell radio network temporary identifier (C-RNTI), a temporary mobile subscriber identity (TMSI), or an international mobile subscriber identification number (IMSI); or may be a truncated part of the foregoing identifier.

Optionally, the first terminal device may hand over the first terminal device and the at least one second terminal device based on the first identification information by using the following operations.

S1201. The first terminal device sends first handover assistance information to the first network device, where the first handover assistance information includes identification information of the first terminal device and the identification information of the at least one second terminal device.

Optionally, the first handover assistance information further includes at least one of the following: a measurement result obtained by measuring, by the first terminal device, a signal sent by the first network device; a measurement result obtained by measuring, by the first terminal device, a signal sent by the second network device; and third indication information. The third indication information is used to indicate that the first terminal device prepares to perform group handover.

Optionally, the first terminal device may send the first handover assistance information to the first network device when a timer Timer 1 expires. For example, after the second predefined event (2) triggers the sending the discovery message, the first terminal device starts the timer Timer 1. If the first terminal device receives the second handover request from the at least one second terminal device before the Timer 1 expires, the first terminal device performs a group handover process; or if the first terminal device has not received the second handover request from the at least one second terminal device when the Timer 1 expires, the first terminal device may perform a conventional handover procedure.

Optionally, before the first terminal device sends the first handover assistance information to the first network device, the first terminal device may determine, based on a capability of the first terminal device, for example, a maximum quantity of second terminal devices that can be carried by the first terminal device in one handover, whether to accept the second handover request of the at least one second terminal device.

S1205. The first terminal device receives first handover indication information sent by the first network device, where the first handover indication information includes configuration information of the first terminal device and configuration information of the at least one second terminal device.

The first terminal device performs handover from the first network device to the second network device based on the first handover indication information, and assists, based on the first handover indication information, in handing over the at least one second terminal device from the first network device to the second network device.

Optionally, as shown in FIG. 3, the first terminal device may be handed over from the first network device to the second network device based on the first handover indication information, and assist, based on the first handover indication information, in handing over the at least one second terminal device from the first network device to the second network device by using the following operations.

S1202. The first terminal device sends a feedback message to the at least one second terminal device, where the feedback message is used to indicate whether the second handover request is accepted.

Optionally, the feedback message may include at least one of the following: identification information of at least one second terminal device that is accepted for group handover, identification information of at least one second terminal device that is not accepted for group handover, and identification information of all at least one second terminal device that is detected by the first terminal device.

When the feedback message includes the identification information of all the at least one second terminal device that is detected by the first terminal device, the feedback message further includes fourth indication information. The indication information is used to indicate whether the second terminal device is accepted for group handover. A quantity of the fourth indication information is equal to a quantity of identification information of the second terminal device.

Optionally, when the at least one second terminal device receives the feedback message indicating that the at least one second terminal device is accepted for group handover, the at least one second terminal device may start a timer Timer 2. If receiving second handover indication information described in S1208 before the Timer 2 expires, the at least one second terminal device performs group handover; or if not receiving second handover indication information described in S1208 when the Timer 2 expires, the at least one second terminal device performs a conventional handover procedure.

Optionally, when the at least one second terminal device receives the feedback message indicating that the at least one second terminal device is accepted for group handover, the at least one second terminal device may start a timer Timer 3. During running of the Timer 3, the at least one second terminal device does not receive second handover indication information described in S1208. There is a minimum delay between a time when the second terminal device receives the feedback message and S1207. This can reduce power consumption caused by listening, by the at least one second terminal device, to the information described in S1208. The at least one second terminal device needs to start to listen to the message described in S1208 only after the Timer 3 expires.

S1203. The first network device sends a third handover request message to the second network device based on the first handover assistance information, where the third handover request message includes the identification information of the first terminal device, the identification information of the at least one second terminal device, context information of the first terminal device, and context information of the at least one second terminal device.

Optionally, before sending the third handover request message to the second network device, the first network device may determine whether to accept the handover request. The first network device first determines, based on measurement results obtained by the first terminal device through measurement for the first network device and the second network device, whether to hand over the first terminal device. Then the first network device determines, based on the third indication information in the first handover assistance information, namely, indication information used to request to perform group handover, whether to hand over the at least one second terminal device. If the first network device accepts the handover request of the first terminal device and the at least one second terminal device, a group handover procedure is performed, a security key is generated for the first terminal device and the at least one second terminal device, and then the first network device sends the third handover request message to the second network device.

Optionally, context information of the first terminal device and the at least one second terminal device includes: a security capability, a security key, and a quality of service (QoS) parameter of the context information of the first terminal device and the at least one second terminal device.

Optionally, the first network device sends the third handover request message to the second network device in the following two manners.

A first sending manner is: sending complete context information of each terminal device, that is, sending context information of all terminal devices to the second network device together.

A second sending manner is: sending compressed context information of terminal devices. That is, some parameters are the same and may be sent only once. This can reduce a size of the third handover request message. For example, the following parameters may be sent only once: a cause value, the identification information of the second network device, X2 application protocol identifiers (Old eNB UE X2AP ID) of the first network device and the terminal devices, and a globally unique mobile management entity identity (GUMMEI).

S1204. The first network device receives a handover request response message sent by the second network device, where the handover request response message includes configuration information of the first terminal device and the at least one second terminal device.

Optionally, the handover request response message further includes cell radio network temporary identifiers (C-RNTI) newly allocated by the second network device to the first terminal device and the at least one second terminal device, resource configuration information, and security information.

Optionally, the second network device may send the handover request response message to the first network device in the following two manners.

A first sending manner is: sending complete configuration information of each terminal device, that is, sending configuration information of all terminal devices to the first network device together.

A second sending manner is: sending compressed configuration information of terminal devices. That is, some parameters are the same and may be sent only once. This can reduce a size of the handover request response message. For example, the following parameters may be sent only once: an identifier of the second network device, a frequency used by the second network device, and bandwidth of the second network device; or an identifier of a target cell, a frequency used by the target cell, and bandwidth of the target cell.

Optionally, the handover request response message may further include uplink resource allocation information of the first terminal device and the at least one second terminal device.

Optionally, the handover request response message may include only a random access resource of the first terminal device. The random access resource is used by the first terminal device to initiate a random access request to the second network device, so as to obtain a random access response from the second network device. The random access response includes a first uplink timing advance (TA). The first uplink timing advance TA is used by the first terminal device and the at least one second terminal device to send uplink signals. It is understood that a same TA may be used if the first terminal device and the at least one second terminal device are quite close to each other. Power for the discovery message in S1201 may be controlled to ensure that the first terminal device and the at least one second terminal device use a same TA. For example, the power for the discovery message may be reduced to a first power threshold. When the power for the discovery message is quite small, only a second terminal device close to the first terminal device can receive the discovery message. This can ensure that the first terminal device and the at least one second terminal device use a same TA.

It is further understood that, if the first terminal device and the at least one second terminal device are quite far away from each other, a same TA cannot be used. In this case, the handover request response message includes random access resources of the first terminal device and the at least one second terminal device. The random access resources are used by the first terminal device and the at least one second terminal device each to initiate a random access request to the second network device, so as to receive a random access response for each of the first terminal device and the at least one second terminal device. The random access response includes a TA of the first terminal device and a TA of the at least one second terminal device.

The random access resource is a sequence used for random access, for example, a preamble.

S1205. The first terminal device receives first handover indication information sent by the first network device, where the first handover indication information includes configuration information of the first terminal device and configuration information of the at least one second terminal device.

When the first network device receives the configuration information of the first terminal device and the at least one second terminal device, the first network device determines that the second network device accepts the first handover request, and the first network device sends the first handover indication information to the first terminal device. The first handover indication information includes the configuration information of the first terminal device and the configuration information of the at least one second terminal device. The configuration information includes a sequence used when the at least one second terminal device performs random access, and a time-frequency resource used by the at least one second terminal device to send the random access sequence.

It is understood that if the handover request response message in S1204 includes the uplink resource allocation information, such as a UL grant, of the first terminal device and the at least one second terminal device, the first handover indication information further includes the uplink resource allocation information of the first terminal device and the at least one second terminal device.

Optionally, the first network device sends the first handover indication information in the following two manners.

A first sending manner is: sending complete configuration information of each terminal device.

A second sending manner is: sending compressed configuration information of terminal devices, so as to reduce a size of the first handover indication information, so that the first terminal device can successfully receive the first handover indication information.

It is understood that when the first terminal device receives the first handover indication information sent by the first network device, optionally, the first terminal device stops receiving a downlink signal sent by the first network device, and stops sending an uplink signal to the first network device. Then based on the first handover indication information indicating a network device to which the first terminal device is to be handed over, the first terminal device starts to receive a downlink signal sent by the network device on an indicated frequency, and performs a downlink synchronization process.

S1206. The first terminal device sends a first random access request to the second network device based on the configuration information of the first terminal device.

Optionally, the first terminal device sends a random access sequence to the second network device based on the configuration information of the first terminal device. The random access sequence is used by the first terminal device to send the first random access request to the second network device.

After the first terminal device is synchronized to the second network device, the first terminal device initiates a random access request to the second network device based on the configuration information of the first terminal device in the first handover indication information and by using a corresponding random access resource. The random access request may be a random access sequence, for example, a preamble sequence.

S1207. The first terminal device receives a first random access response sent by the second network device, where the first random access response includes a first uplink timing advance, and the first uplink timing advance is used by the first terminal device and the at least one second terminal device to send uplink signals.

When detecting, on the random access resource, the first random access request initiated by the first terminal device, the second network device determines that the first random access request is initiated for group handover. Then the second network device sends the first random access response to the first terminal device. The first random access response includes the first uplink timing advance. The first uplink timing advance is used by the first terminal device and the at least one second terminal device to send uplink signals.

It is understood that a same TA may be used if the first terminal device and the at least one second terminal device are quite close to each other. Power for the discovery message in S1201 may be controlled to ensure that the first terminal device and the at least one second terminal device use a same TA. For example, a transmit power for the discovery message may be reduced to a first power threshold. When the transmit power for the discovery message is quite small, only a second terminal device close to the first terminal device can receive the discovery message. This can ensure that the first terminal device and the at least one second terminal device use a same TA.

Optionally, when the handover request response message in S1204 includes the uplink resource allocation information of the first terminal device and the at least one second terminal device, and the first handover indication information includes the uplink resource allocation information of the first terminal device and the at least one second terminal device, the first random access response does not include the uplink resource allocation information of the first terminal device and the at least one second terminal device.

S1208. The first terminal device sends second handover indication information to the at least one second terminal device, where the second handover indication information includes the first uplink timing advance and the configuration information of the at least one second terminal device.

When the first terminal device receives the first uplink timing advance, the configuration information of the first terminal device, and the configuration information of the at least one second terminal device, the first terminal device sends the second handover indication information to the at least one second terminal device. The second handover indication information includes the first uplink timing advance and the configuration information of the at least one second terminal device. The configuration information includes the sequence used when the at least one second terminal device performs random access, and the time-frequency resource used by the at least one second terminal device to send the random access sequence.

Optionally, the second handover indication information further includes uplink resource allocation information of the at least one second terminal device. The uplink resource allocation information of the at least one second terminal device may be sent to the first network device by using the handover request response message in S1204, then sent to the first terminal device by using the first handover indication information, and further sent to the at least one second terminal device by using the second handover indication information; or may be sent to the first terminal device by using the first random access response in S1207, and further sent to the at least one second terminal device by using the second handover indication information.

S1220. The first terminal device and the at least one second terminal device send radio resource control (RRC) connection reconfiguration complete messages to the second network device by using the first uplink timing advance and a corresponding uplink resource indicated by the uplink resource allocation information. In this case, a handover process is completed.

According to the handover method in this embodiment of this application, before the handover, the first terminal device collaborates with the second terminal device to generate a handover group. The first terminal device assists the at least one second terminal device in completing a handover process. This can reduce impact of signaling on a network side caused by simultaneous handover of a large quantity of terminal devices, and reduce a service interruption time during handover.

It is understood that the first terminal device and the at least one second terminal device may be quite close to each other, and use a same TA; or when the first terminal device and the at least one second terminal device are relatively far away from each other, the first terminal device and the at least one second terminal device may separately obtain respective TAs.

Figure 4:
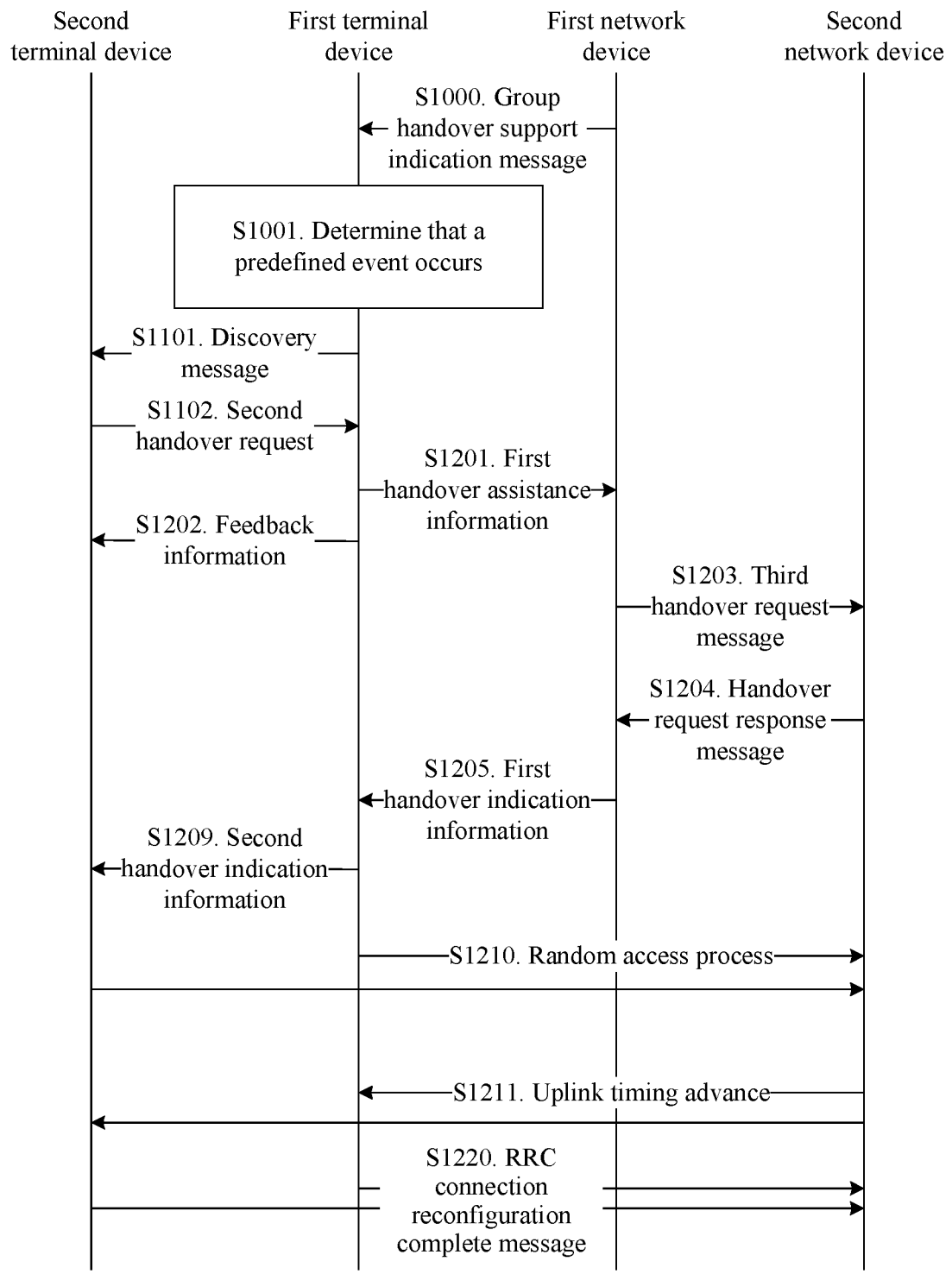
FIG. 4 is still another schematic flowchart of a handover method according to an embodiment of this application.

FIG. 4 is still another schematic flowchart of a handover method according to an embodiment of this application.

Optionally, as shown in FIG. 4, a first terminal device may be handed over from a first network device to a second network device based on first handover indication information, and assist, based on the first handover indication information, in handing over at least one second terminal device from the first network device to the second network device by using the following operations.

It is understood that operations before S1209 in the handover method shown in FIG. 4 are the same as corresponding operations in FIG. 3. For brevity, details are not described herein again.

S1209. The first terminal device sends second handover indication information to the at least one second terminal device, where the second handover indication information includes configuration information of the at least one second terminal device, the configuration information of the at least one second terminal device is used by the at least one second terminal device to send a second random access request to the second network device, so as to receive a second random access response sent by the second network device, and the second random access response includes an uplink timing advance of the at least one second terminal device.

Optionally, if the handover request response message in S1204 includes uplink resource allocation information of the first terminal device and the at least one second terminal device, the second handover indication information further includes uplink resource allocation information of the at least one second terminal device.

S1210. The first terminal device sends a first random access request to the second network device based on configuration information of the first terminal device, and the at least one second terminal device sends the second random access request to the second network device based on the configuration information of the at least one second terminal device.

S1211. The first terminal device receives a first random access response sent by the second network device, where the first random access response includes an uplink timing advance of the first terminal device; and the at least one second terminal device receives the second random access response sent by the second network device, where the second random access response includes the uplink timing advance of the at least one second terminal device.

Optionally, if the handover request response message in S1204 does not include uplink resource allocation information of the first terminal device and the at least one second terminal device, the first random access response further includes uplink resource allocation information of the first terminal device, and the second random access response further includes uplink resource allocation information of the at least one second terminal device. According to the handover method in this embodiment of this application, before the handover, the first terminal device collaborates with the second terminal device to generate a handover group. The first terminal device assists the at least one second terminal device in completing a handover process. This can reduce impact of signaling on a network side caused by simultaneous handover of a large quantity of terminal devices, and reduce a service interruption time during handover. In addition, this reduces a spatial distribution requirement for terminal devices, and better helps the terminal devices successfully access the second network device.

Figure 5:
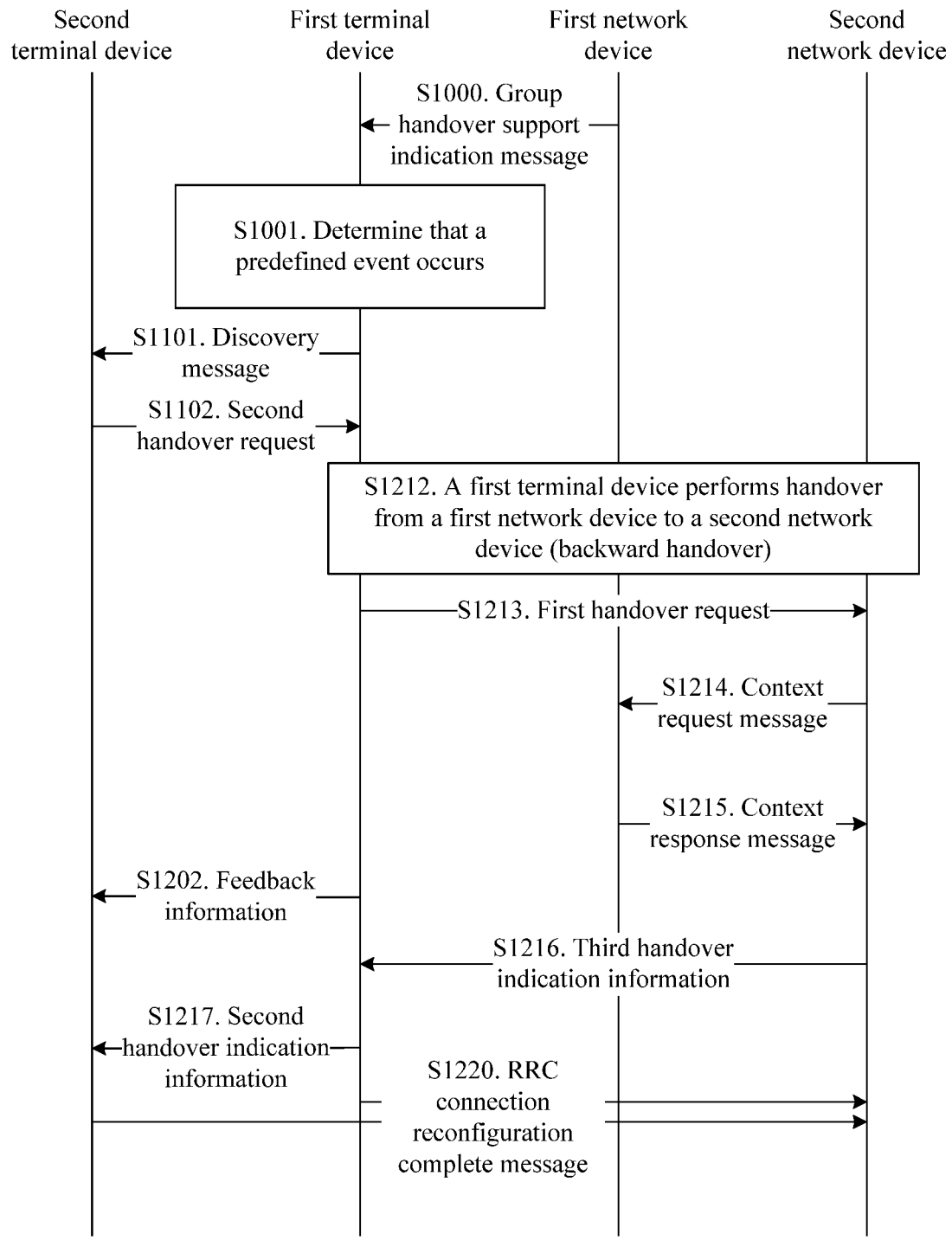
FIG. 5 is still another schematic flowchart of a handover method according to an embodiment of this application.

FIG. 5 is still another schematic flowchart of a handover method according to an embodiment of this application.

It understood that a first terminal device and at least one second terminal device may be simultaneously handed over from a first network device to a second network device; or the first terminal device may be first handed over from the first network device to the second network device, and then hand over the at least one second terminal device from the first network device to the second network device based on identification information of the at least one second terminal device.

Optionally, that the first terminal device performs handover of the first terminal device and the at least one second terminal device based on the identification information includes the following operations.

S1212. The first terminal device performs handover from the first network device to the second network device.

S1213. The first terminal device sends a first handover request to the second network device, where the first handover request includes the identification information of the at least one second terminal device.

S1216: The first terminal device receives third handover indication information sent by the second network device, where the third handover indication information includes configuration information of the at least one second terminal device.

The first terminal device assists, based on the third handover indication information, in handing over the at least one second terminal device from the first network device to the second network device.

Optionally, the first terminal device may assist, based on the third handover indication information, in handing over the at least one second terminal device from the first network device to the second network device by using the following operations.

It is understood that operations before S1212 in the handover method shown in FIG. 5 are the same as corresponding operations in FIG. 2. For brevity, details are not described herein again.

S1212. The first terminal device performs handover from the first network device to the second network device.

The first terminal device may be handed over from the first network device to the second network device by using a backward handover technology. The backward handover technology includes the following process.

In a handover preparation phase, the first terminal device in an RRC connected mode sends a handover request message to the first network device according to a measurement reporting trigger criterion, where the handover request message is used to indicate that the first terminal device is to be handed over.

The first network device determines the second network device for the terminal device based on an RRM algorithm and a measurement report of the first terminal device, and sends context information of the first terminal device to the second network device.

The second network device allocates a C-RNTI to the first terminal device, configures another parameter for the first terminal device, and sends the C-RNTI and the another parameter to the first network device by using a handover request acknowledgement message. After the first network device receives the handover request acknowledgement message, the first network device prepares to forward packet data to the second network device.

The first terminal device receives a handover command sent by the first network device, where the handover command includes the C-RNTI allocated by the second network device, the parameter configured by the second network device for the first terminal device, and a system message of the second network device. The first terminal device leaves the first network device and is synchronized to the second network device.

In this case, the first network device forwards, to the second network device, buffered packet data and packet data transferred from a serving gateway (S-GW). The second network device caches received packet data.

After leaving the first network device, the first terminal device starts a downlink synchronization process with the second network device at a handover start moment, and initiates a random access request to the second network device.

The second network device sends a random access response to the first terminal device, where the random access response includes a TA and uplink resource allocation information.

The first terminal device sends a handover acknowledgement message to the second network device, where the handover acknowledgement message is used to indicate that handover is completed.

The second network device sends a handover complete message to the first network device. Then the first network device may clear data that has been forwarded to the second network device. In this case, if the first network device still has data that needs to be forwarded to the second network device, the first network device may continue to forward the data. The second network device instructs a mobility management entity (MME)/S-GW to update homing information of the terminal device, so that the MME/S-GW may directly send new data to the second network device.

It is understood that the first terminal device may be handed over from the first network device to the second network device by using a forward handover technology. The forward handover technology includes the following process.

The first terminal device interrupts communication with the first network device, and is synchronized to the second network device in downlink.

The first terminal device sends a first random access request to the second network device.

The first terminal device receives a first random access response sent by the second network device, where the first random access response includes a TA and uplink resource allocation information of the first terminal device.

S1213. The first terminal device sends a first handover request to the second network device, where the first handover request includes the identification information of the at least one second terminal device.

S1214. The second network device sends a context request message to the first network device, where the context request message is used to request context information of the at least one second terminal device.

S1215. The first network device sends a context response message to the second network device, where the context response message includes the context information of the at least one second terminal device.

Optionally, the first network device may send the context information to the second network device in S1214 and S1215 before the first terminal device is handed over from the first network device to the second network device. The first terminal device sends the identification information of the second terminal device to the first network device, and the first network device may send context information of the first terminal device and the context information of the at least one second terminal device to the second network device in advance.

Optionally, after sending the first handover request to the second network device, the first terminal device may send a feedback message to the at least one second terminal device.

S1202. The first terminal device sends a feedback message to the at least one second terminal device, where the feedback message is used to indicate whether the second handover request is accepted.

Optionally, after the second terminal device sends the second handover request to the first terminal device in S1102, the second terminal device may start a timer Timer 4. If the at least one second terminal device receives the feedback message described in S1202 before the Timer 4 expires, the at least one second terminal device determines that the first terminal device has been successfully handed over and accepts to hand over the at least one second terminal device; or if the at least one second terminal device has not received the feedback message described in S1202 when the Timer 4 expires, the at least one second terminal device returns to an existing handover procedure.

Optionally, when the at least one second terminal device receives the feedback message, if the at least one second terminal device can perform group handover, the at least one second terminal device starts a timer Timer 5. If the at least one second terminal device receives second handover indication information described in S1217 before the Timer 5 expires, the at least one second terminal device performs group handover based on the second handover indication information; or if the at least one second terminal device has not received second handover indication information described in S1217 when the Timer 5 expires, the at least one second terminal device returns to an existing handover procedure.

S1216: The first terminal device receives third handover indication information sent by the second network device, where the third handover indication information includes configuration information of the at least one second terminal device.

S1217. The first terminal device sends second handover indication information to the at least one second terminal device, where the second handover indication information includes the configuration information of the at least one second terminal device, uplink resource allocation information of the at least one second terminal device, and an uplink timing advance of the first terminal device, and the uplink timing advance of the first terminal device is used by the at least one second terminal device to send an uplink signal.

After the second terminal device receives the second handover indication information sent by the first terminal device, the at least one second terminal device sends a radio resource control (RRC) connection reconfiguration complete message to the second network device by using the first uplink timing advance and corresponding uplink resource allocation information, where the second handover indication information includes the configuration information of the at least one second terminal device, the uplink resource allocation information of the at least one second terminal device, and the uplink timing advance of the first terminal device, and the uplink timing advance of the first terminal device is used by the at least one second terminal device to send an uplink signal. In this case, a handover process is completed.

Optionally, the third handover indication information may include only the configuration information of the at least one second terminal device. In this case, the second handover indication information includes only the configuration information of the at least one second terminal device. The at least one second terminal device initiates a second random access request to the second network device based on the configuration information of the at least one second terminal device, so as to obtain a second random access response sent by the second network device. The second random access response includes the uplink resource allocation information of the at least one second terminal device. The configuration information includes a sequence used when the at least one second terminal device performs random access, and a time-frequency resource used by the at least one second terminal device to send the random access sequence. According to the handover method in this embodiment of this application, before the handover, the first terminal device collaborates with the second terminal device to generate a handover group. The first terminal device assists the at least one second terminal device in completing a handover process. This can reduce impact of signaling on a network side caused by simultaneous handover of a large quantity of terminal devices, and reduce a service interruption time during handover. Several timers are introduced, thereby shortening a waiting time of the second terminal device, reducing a call drop rate of the second terminal device, and enabling the second terminal device to return to the existing handover procedure in a timely manner.

Figure 6:
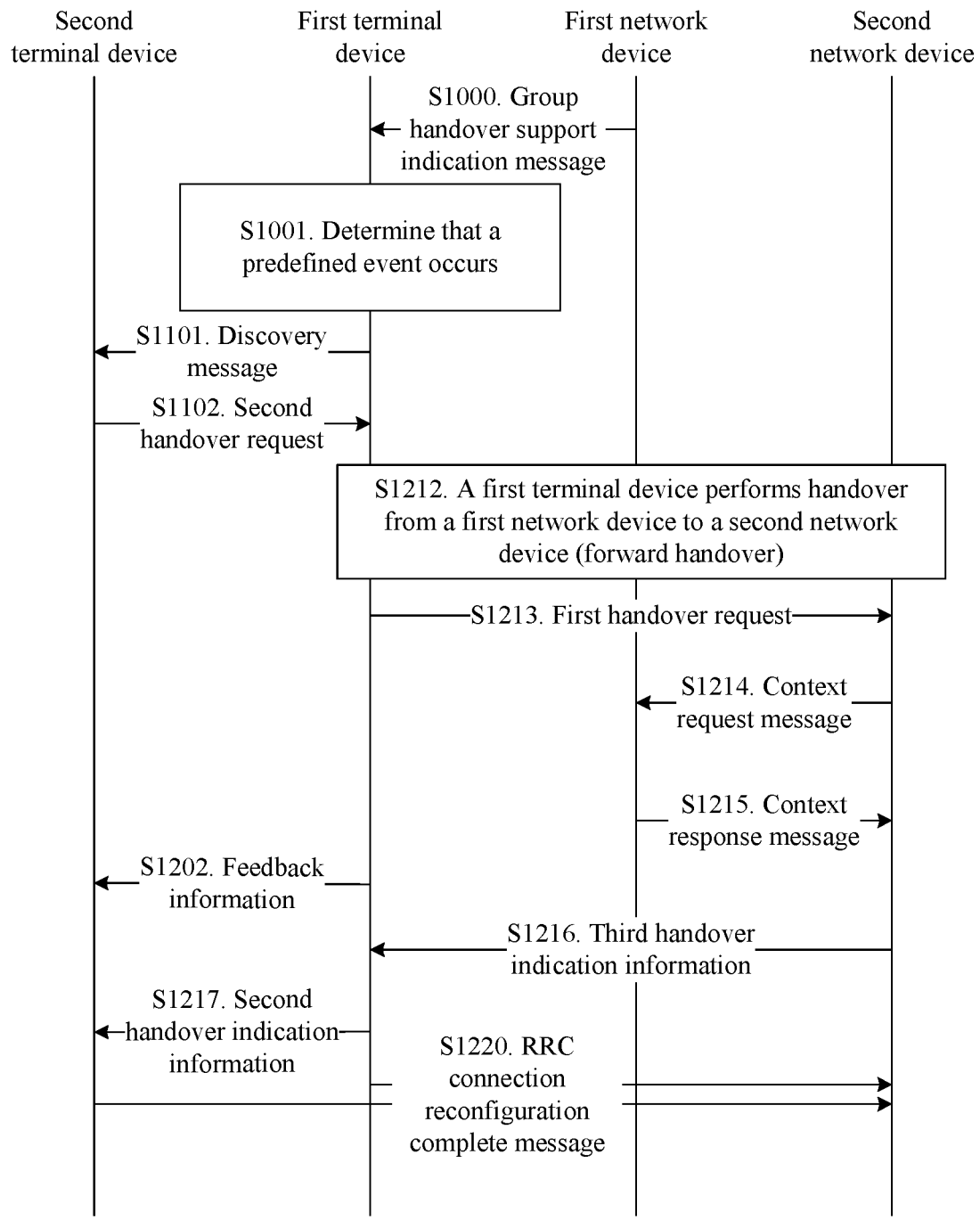
FIG. 6 is still another schematic flowchart of a handover method according to an embodiment of this application.

FIG. 6 is still another schematic flowchart of a handover method according to an embodiment of this application.

Optionally, a first terminal device may assist, based on third handover indication information, in handing over at least one second terminal device from a first network device to a second network device by using the following operations.

It is understood that operations before S1212 in the handover method shown in FIG. 6 are the same as corresponding operations in FIG. 2, and operations after S1212 are the same as corresponding operations in FIG. 5. For brevity, details are not described herein again.

S1212. The first terminal device performs handover from the first network device to the second network device.

The first terminal device may be handed over from the first network device to the second network device by using a forward handover technology. The forward handover technology includes the following process.

The first terminal device interrupts communication with the first network device, and is synchronized to the second network device in downlink.

The first terminal device sends a first random access request to the second network device.

The first terminal device receives a first random access response sent by the second network device, where the first random access response includes a TA and uplink resource allocation information of the first terminal device.

It is understood that the first terminal device may be handed over from the first network device to the second network device by using a backward handover technology. For brevity, details are not described herein again.

Optionally, the third handover indication information may include only configuration information of the at least one second terminal device. In this case, second handover indication information includes only the configuration information of the at least one second terminal device. The at least one second terminal device initiates a second random access request to the second network device based on the configuration information of the at least one second terminal device, so as to obtain a second random access response sent by the second network device. The second random access response includes uplink resource allocation information of the at least one second terminal device. The configuration information includes a sequence used when the at least one second terminal device performs random access, and a time-frequency resource used by the at least one second terminal device to send the random access sequence. According to the handover method in this embodiment of this application, before the handover, the first terminal device collaborates with the second terminal device to generate a handover group. The first terminal device assists the at least one second terminal device in completing a handover process. This can reduce impact of signaling on a network side caused by simultaneous handover of a large quantity of terminal devices, and reduce a service interruption time during handover. The first terminal device accesses the second network device in advance, thereby reducing call drops of the first terminal device on the first network device due to deterioration of signal quality.

Figure 7:
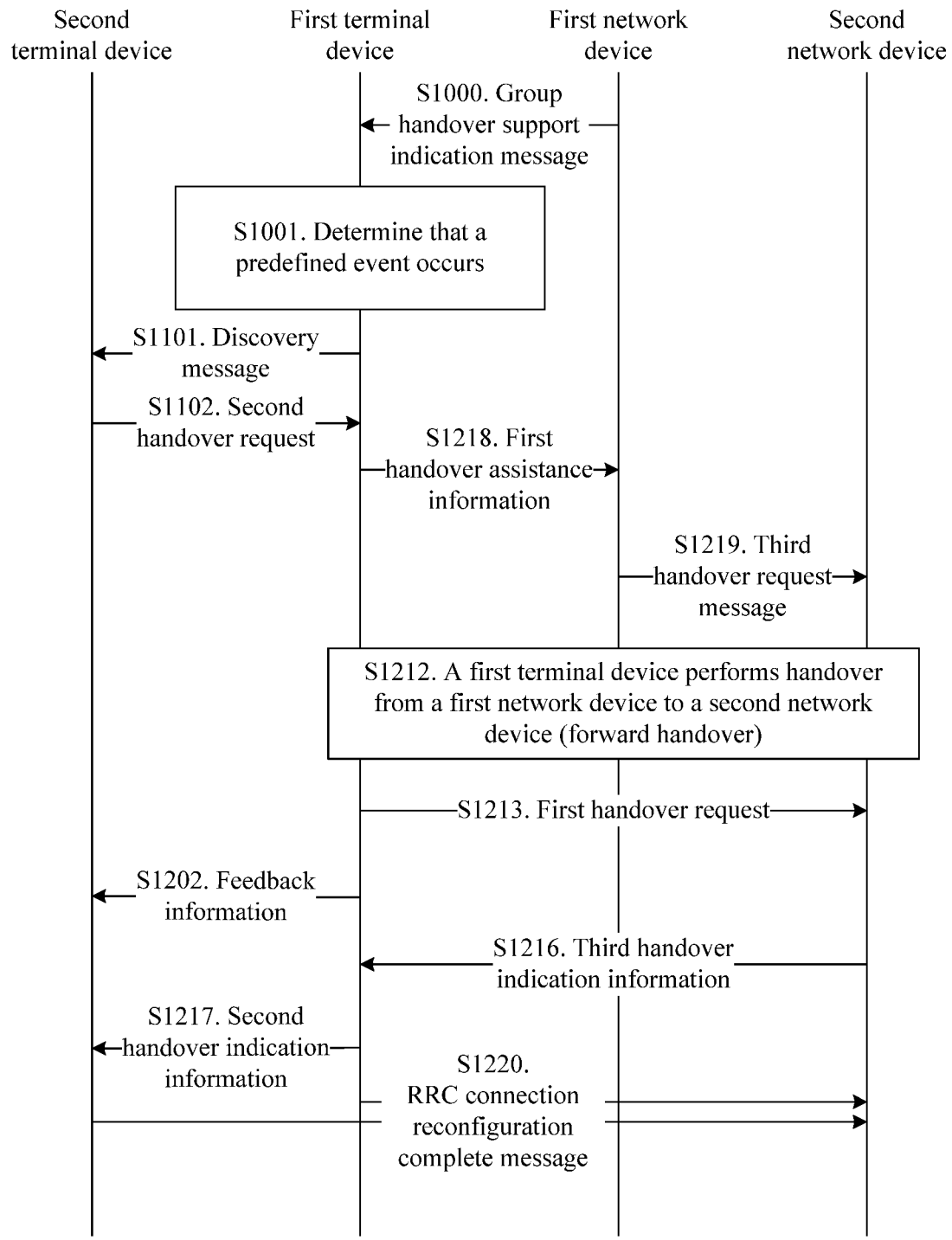
FIG. 7 is still another schematic flowchart of a handover method according to an embodiment of this application.

FIG. 7 is still another schematic flowchart of a handover method according to an embodiment of this application.

Optionally, a first terminal device may assist, based on third handover indication information, in handing over at least one second terminal device from a first network device to a second network device by using the following operations.

It is understood that S1102 and operations before S1102 in the handover method shown in FIG. 7 are the same as corresponding operations in FIG. 5. For brevity, details are not described herein again.

S1218. The first network device receives first handover assistance information sent by the first terminal device, where the first handover assistance information includes identification information of the first terminal device and identification information of the at least one second terminal device.

S1219. The first network device sends a third handover request message to the second network device based on the first handover assistance information, where the third handover request message includes the identification information and context information of the first terminal device and the at least one second terminal device.

It is understood that, before the first terminal device performs handover from the first network device to the second network device, if the second network device has received the identification information and the context information of the first terminal device and the at least one second terminal device that are in the third handover request message in S1219, operations S1214 and S1215 do not need to be performed.

S1212. The first terminal device performs handover from the first network device to the second network device.

The first terminal device may be handed over from the first network device to the second network device by using a forward handover technology.

It is understood that the first terminal device may be alternatively handed over from the first network device to the second network device by using a backward handover technology.

S1213. The first terminal device sends a first handover request to the second network device.

It is understood that the identification information of the at least one second terminal device has been sent to the second network device in S1219, and the first handover request does not include the identification information of the at least one second terminal device.

S1216: The first terminal device receives third handover indication information sent by the second network device, where the third handover indication information includes configuration information of the at least one second terminal device.

Operations after S1216 are the same as corresponding operations in FIG. 5. For brevity. Details are not described herein again.

Optionally, the third handover indication information may include only configuration information of the at least one second terminal device. In this case, the second handover indication information includes only the configuration information of the at least one second terminal device. The at least one second terminal device initiates a second random access request to the second network device based on the configuration information of the at least one second terminal device, so as to obtain a second random access response sent by the second network device. The second random access response includes uplink resource allocation information of the at least one second terminal device. The configuration information includes a sequence used when the at least one second terminal device performs random access, and a time-frequency resource used by the at least one second terminal device to send the random access sequence. According to the handover method in this embodiment of this application, before the handover, the first terminal device collaborates with the second terminal device to generate a handover group. The first terminal device assists the at least one second terminal device in completing a handover process. This can reduce impact of signaling on a network side caused by simultaneous handover of a large quantity of terminal devices, and reduce a service interruption time during handover. Context information of a second terminal device that needs to be handed over is sent to the second network device in advance by using the first handover assistance information of the first terminal device, thereby reducing a delay in a process of receiving, by the first terminal device, information from the second network device.

It is understood that the examples in the embodiments of this application are merely intended to help a person skilled in the art better understand the embodiments of this application, but not to limit the scope of the embodiments of this application.

It is understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

With reference to the foregoing ideas of handover, in a tracking area update (TAU) process, similar solutions may also be used to perform a tracking area update.

Figure 8:
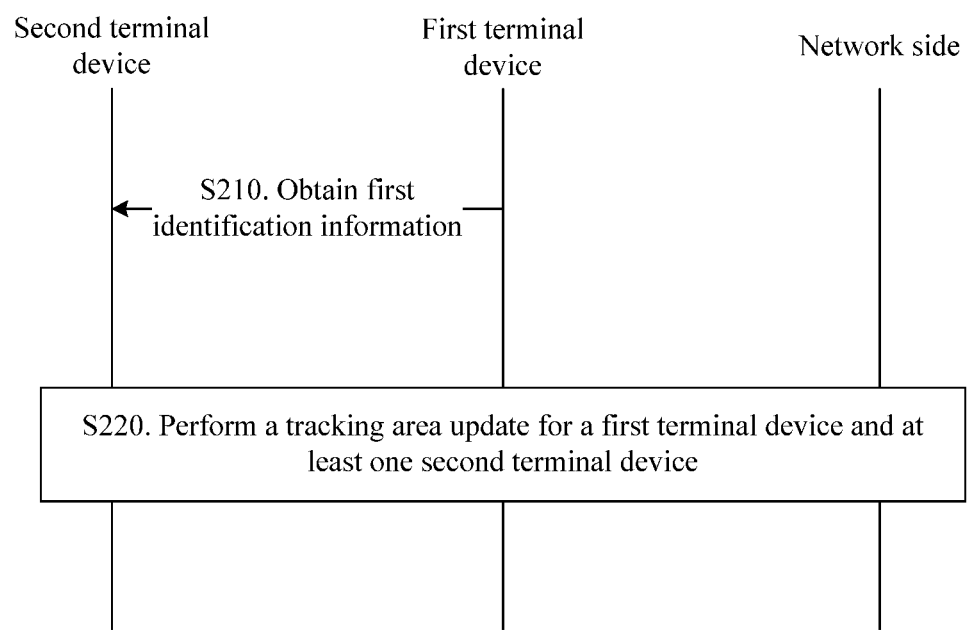
FIG. 8 is a schematic flowchart of a tracking area update method according to an embodiment of this application.

FIG. 8 is a schematic flowchart of a tracking area update method 200 according to an embodiment of this application.

S210. A first terminal device obtains first identification information, where the first identification information includes identification information of at least one second terminal device, and the second terminal device needs to perform a tracking area update.

S220. The first terminal device performs the tracking area update for the first terminal device and the at least one second terminal device based on the first identification information, where the tracking area update is changing from a first tracking area to a second tracking area.

Optionally, before the first terminal device obtains the first identification information, the method further includes:

determining, by the first terminal device, that the tracking area update needs to be performed.

Optionally, the first terminal device may obtain the first identification information in S210 by using the following operations:

sending, by the first terminal device, a discovery message, where the discovery message is used to indicate that the first terminal device prepares to perform the tracking area update; and receiving, by the first terminal device, a tracking area update request message sent by the at least one second terminal device, where the tracking area update request message includes the identification information of the at least one second terminal device.

Optionally, the first terminal device may perform the tracking area update for the first terminal device and the at least one second terminal device based on the first identification information in S220 by using the following operations:

sending, by the first terminal device, a first update request message to a network side, where the first update request message includes identification information of the first terminal device and the identification information of the at least one second terminal device, and the first update request message is used by the network side to perform the tracking area update for the first terminal device and the at least one second terminal device;

receiving, by the first terminal device, a first acknowledgement message sent by the network side, where the first acknowledgement message includes an identity of the second tracking area; and sending, by the first terminal device, a second acknowledgement message to the at least one second terminal device, where the second acknowledgement message includes the identity of the second tracking area.

Optionally, the identity of the second tracking area in the first acknowledgement message may be a tracking area identity list (TAI List).

It is understood that the foregoing tracking area update method is described by using a terminal device as an execution body.

It is further understood that the network side is a collective name of network devices. The network side includes an access network and a core network. The network side may include a base station, an MME, an S-GW, a packet data network gateway (PDN GW), a home subscriber server (HSS), and a policy and charging rules function (PCRF).

Figure 9A:
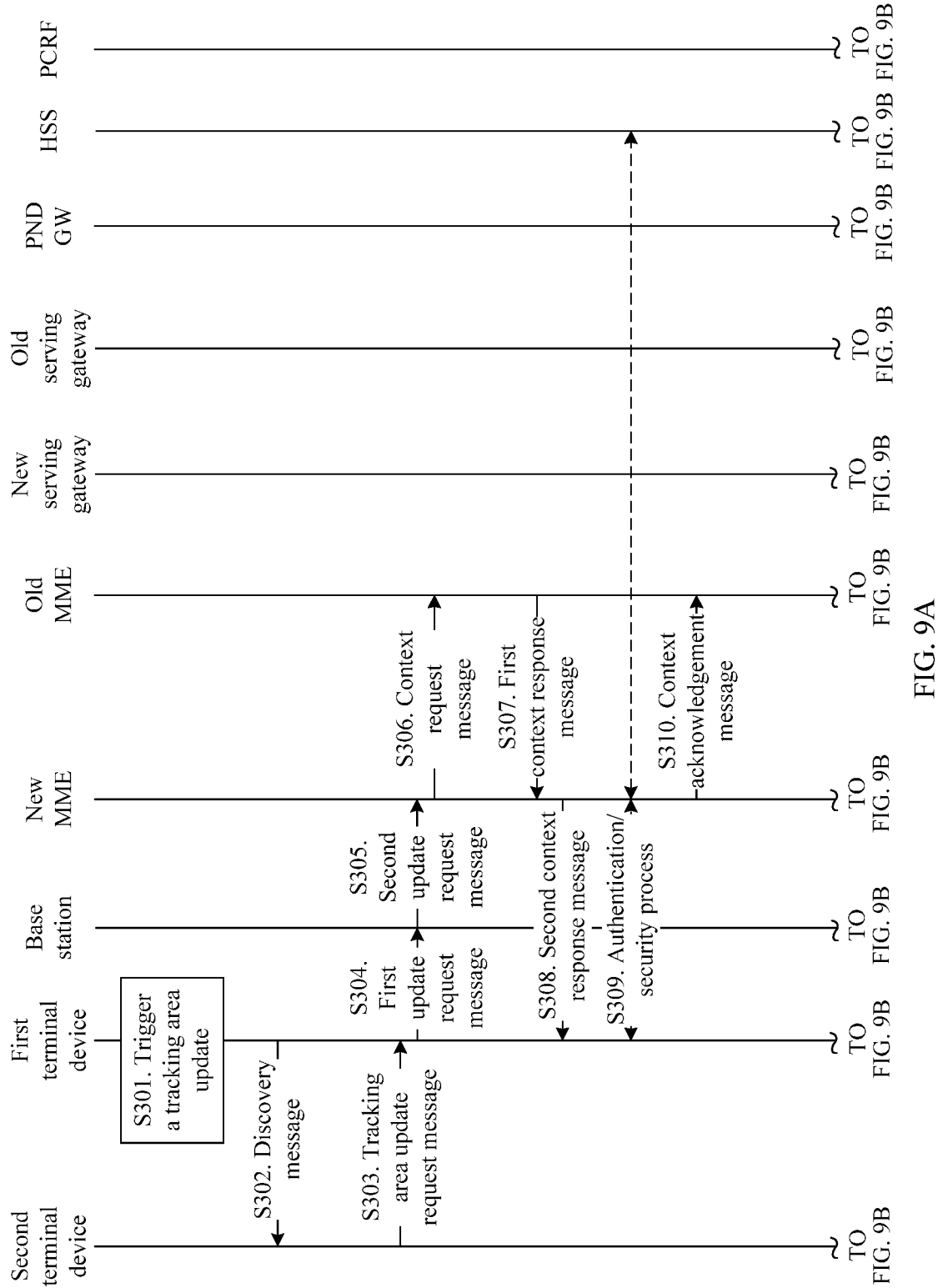
FIG. 9A and FIG. 9B are another schematic flowchart of a tracking area update method according to an embodiment of this application.
Figure 9B:
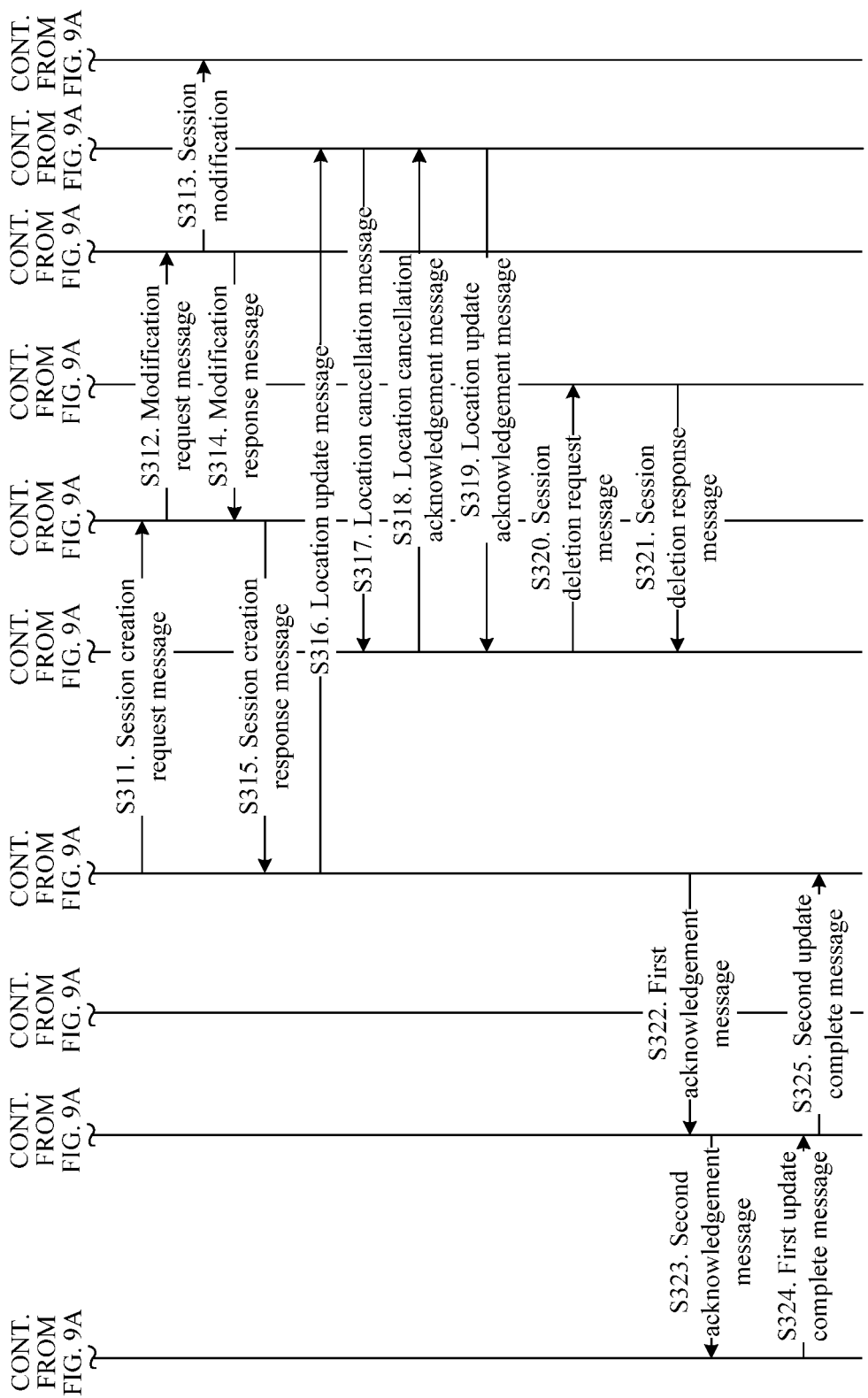

FIG. 9A and FIG. 9B are another schematic flowchart of a tracking area update method according to an embodiment of this application. The tracking area update method is further described.

S301. A first terminal device triggers a tracking area update.

A tracking area update trigger condition may be a predefined event 3, where the predefined event 3 is: when the first terminal device enters a new tracking area, triggering the first terminal device to perform a tracking area update process; or a tracking area update trigger condition may be a predefined event 4, where the predefined event 4 is: when the first terminal device has not performed a tracking area update for a long time, triggering the first terminal device to perform a tracking area update process. When the first terminal device is performing a tracking area update, the first terminal device is first triggered to initiate a tracking area update indication, that is, S302 is performed.

Optionally, when the first terminal device is triggered to perform the tracking area update, the first terminal device starts a timer Timer 5. During running of the Timer 5, the first terminal device collects information about a second terminal device that requires a tracking area update. If the Timer 5 expires, the first terminal device initiates a connection to a base station, to perform a tracking area update process.

S302. The first terminal device sends a discovery message, where the discovery message is used to indicate that the first terminal device prepares to perform the tracking area update.

Optionally, the discovery message includes identification information of a cell in which the first terminal device is located, identification information of a current serving base station, tracking area update indication information, and a second tracking area code (TAC).

S303. The first terminal device receives a tracking area update request message sent by at least one second terminal device, where the tracking area update request message includes identification information of the at least one second terminal device.

After the at least one second terminal device receives the discovery message described in operation S302, if the at least one second terminal device determines that the at least one second terminal device also needs to perform a tracking area update, and a second tracking area is the same as a second tracking area of the first terminal device, the at least one second terminal device sends the identification information of the at least one second terminal device to the first terminal device, and instructs to perform the tracking area update.

S304. The first terminal device sends a first update request message to a base station, where the first update request message includes identification information of the first terminal device and the identification information of the at least one second terminal device.

S305. The base station sends a second update request message to a new MME, where the second update request message includes the identification information of the first terminal device and the identification information of the at least one second terminal device.

S306. The new MME sends a context request message to an old MME, where the context request message includes the identification information of the first terminal device and the identification information of the at least one second terminal device.

S307. The old MME sends a first context response message to the new MME, where the first context response message includes the identification information of the first terminal device and the identification information of the at least one second terminal device.

S308. The new MME sends a second context response message to the base station, where the second context response message includes the identification information of the first terminal device and the identification information of the at least one second terminal device.

S309. The first terminal device performs an authentication/security process.

S310. The new MME sends a context acknowledgement message to the old MME, where the context acknowledgement message includes the identification information of the first terminal device and the identification information of the at least one second terminal device.

S311. The new MME sends a session creation request message to a new serving gateway, where the session creation request message includes the identification information of the first terminal device and the identification information of the at least one second terminal device.

S312. The new serving gateway sends a modification request message to a PDN GW, where the modification request message includes the identification information of the first terminal device and the identification information of the at least one second terminal device.

S313. The PDN GW sends a session modification message to a PCRF, where the session modification message includes the identification information of the first terminal device and the identification information of the at least one second terminal device.

S314. The PDN GW sends a modification response message to the new serving gateway, where the modification response message includes the identification information of the first terminal device and the identification information of the at least one second terminal device.

S315. The new serving gateway sends a session creation response message to the new MME, where the session creation response message includes the identification information of the first terminal device and the identification information of the at least one second terminal device.

S316. The new MME sends a location update message to an HSS, where the location update message includes the identification information of the first terminal device and the identification information of the at least one second terminal device.

S317. The HSS sends a location cancellation message to the old MME, where the location cancellation message includes the identification information of the first terminal device and the identification information of the at least one second terminal device.

S318. The old MME sends a location cancellation acknowledgement message to the HSS, where the location cancellation acknowledgement message includes the identification information of the first terminal device and the identification information of the at least one second terminal device.

S319. The HSS sends a location update acknowledgement message to the old MME, where the location update acknowledgement message includes the identification information of the first terminal device and the identification information of the at least one second terminal device.

S320. The old MME sends a session deletion request message to an old serving gateway, where the session deletion request message includes the identification information of the first terminal device and the identification information of the at least one second terminal device.

S321. The old serving gateway sends a session deletion response message to the old MME, where the session deletion response message includes the identification information of the first terminal device and the identification information of the at least one second terminal device.

S322. The first terminal device receives a first acknowledgement message sent by the new MME, where the first acknowledgement message includes a TAI list of the tracking area.

Optionally, a TAI includes a mobile country code (MCC), a mobile network code (MNC), and a TAC.

S323. The first terminal device sends a second acknowledgement message to the at least one second terminal device, where the second acknowledgement message includes a TAI list of the tracking area.

S324. The first terminal device receives a first update complete message sent by the at least one second terminal device.

S325. The first terminal device sends a second update complete message to the new MME, where the second update complete message includes the identification information of the first terminal device and the identification information of the at least one second terminal device.

In this case, the tracking area update for the first terminal device and the at least one second terminal device is completed.

According to the tracking area update method in this embodiment of this application, impact of signaling on an access network and a core network caused by simultaneous tracking area updates of a large quantity of terminal devices in a tracking area update process can be reduced.

The foregoing describes in detail the handover method and the tracking area update method in the embodiments of this application with reference to FIG. 2 to FIG. 9B. The following describes in detail a terminal device and a network device in the embodiments of the present disclosure with reference to FIG. 10 to FIG. 19.

Figure 10:
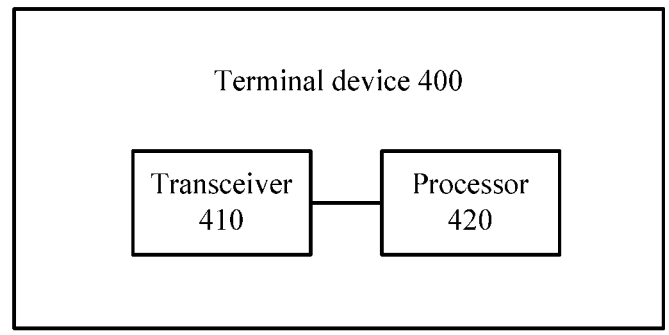
FIG. 10 is a schematic block diagram of a terminal device according to an embodiment of this application.

FIG. 10 is a schematic block diagram of a terminal device 400 according to an embodiment of this application. As shown in FIG. 10, the terminal device 400 includes:

a transceiver 410, configured to obtain first identification information, where the first identification information includes identification information of at least one second terminal device; and a processor 420, configured to hand over the first terminal device and the at least one second terminal device based on the first identification information, where the handover is handover from a first network device to a second network device.

Optionally, the processor 420 is configured to:

control the transceiver to send first handover assistance information to the first network device, where the first handover assistance information includes identification information of the first terminal device and the identification information of the at least one second terminal device;

control the transceiver to receive first handover indication information sent by the first network device, where the first handover indication information includes configuration information of the first terminal device and configuration information of the at least one second terminal device; and perform handover from the first network device to the second network device based on the first handover indication information, and assist, based on the first handover indication information, in handing over the at least one second terminal device from the first network device to the second network device.

Optionally, the processor 420 is further configured to:

control the transceiver to send a first random access request to the second network device based on the configuration information of the first terminal device;

control the transceiver to receive a first random access response sent by the second network device, where the first random access response includes a first uplink timing advance, and the first uplink timing advance is used by the first terminal device and the at least one second terminal device to send uplink signals; and control the transceiver to send second handover indication information to the at least one second terminal device, where the second handover indication information includes the first uplink timing advance and the configuration information of the at least one second terminal device.

Optionally, the first handover indication information further includes uplink resource allocation information of the first terminal device and the at least one second terminal device, or the first random access response further includes uplink resource allocation information of the first terminal device and the at least one second terminal device; and the second handover indication information further includes uplink resource allocation information of the at least one second terminal device.

Optionally, the processor 420 is configured to:

control the transceiver to send second handover indication information to the at least one second terminal device, where the second handover indication information includes the configuration information of the at least one second terminal device, and the configuration information of the at least one second terminal device is used by the at least one second terminal device to send a second random access request to the second network device;

control the transceiver to send a first random access request to the second network device based on the configuration information of the first terminal device; and control the transceiver to receive a first random access response sent by the second network device, where the first random access response includes an uplink timing advance of the first terminal device.

Optionally, the first handover indication information further includes uplink resource allocation information of the first terminal device and the at least one second terminal device, and the second handover indication information further includes uplink resource allocation information of the at least one second terminal device; or the first random access response further includes uplink resource allocation information of the first terminal device, and an uplink timing advance and uplink resource allocation information of the at least one second terminal device are included in a second random access response sent by the second network device.

Optionally, the processor 420 is configured to:

perform handover from the first network device to the second network device;

control the transceiver to send a first handover request to the second network device, where the first handover request includes the identification information of the at least one second terminal device;

control the transceiver to receive third handover indication information sent by the second network device, where the third handover indication information includes configuration information of the at least one second terminal device; and assist, based on the third handover indication information, in handing over the at least one second terminal device from the first network device to the second network device.

Optionally, the third handover indication information further includes uplink resource allocation information of the at least one second terminal device, and the processor 420 is further configured to:

control the transceiver to send second handover indication information to the at least one second terminal device, where the second handover indication information includes the configuration information of the at least one second terminal device, the uplink resource allocation information of the at least one second terminal device, and an uplink timing advance of the first terminal device, and the uplink timing advance of the first terminal device is used by the at least one second terminal device to send an uplink signal.

Optionally, the processor 420 is further configured to:

control the transceiver to send second handover indication information to the at least one second terminal device, where the second handover indication information includes the configuration information of the at least one second terminal device, and the configuration information of the at least one second terminal device is used by the at least one second terminal device to send a second random access request to the second network device.

Optionally, the third handover indication information further includes uplink resource allocation information of the at least one second terminal device, and the second handover indication information further includes the uplink resource allocation information of the at least one second terminal device; or an uplink timing advance and uplink resource allocation information of the at least one second terminal device are included in a second random access response sent by the second network device.

Optionally, the transceiver 410 is further configured to send first handover assistance information to the first network device, where the first handover assistance information includes identification information of the first terminal device and the identification information of the at least one second terminal device, and the first handover assistance information is used to indicate that the first terminal device is to perform group handover.

Optionally, the transceiver 410 is further configured to receive group handover support indication information sent by the first network device, where the group handover support indication information is used to indicate that the first network device supports a group handover operation.

Optionally, the transceiver 410 is further configured to:

send a discovery message, where the discovery message is used to indicate that the first terminal device is to be handed over; and receive a second handover request sent by the at least one second terminal device, where the second handover request includes the identification information of the at least one second terminal device.

Optionally, the transceiver 410 is further configured to send a feedback message to the at least one second terminal device, where the feedback message is used to indicate whether the second handover request is accepted.

Optionally, the processor 420 is further configured to obtain the first identification information if determining that a predefined event occurs.

It is understood that the terminal device 400 in this embodiment of this application may be corresponding to the first terminal device in the embodiments of this application, and the foregoing and other operations and/or functions of the modules in the terminal device 400 are intended to implement corresponding processes in the methods of FIG. 2 to FIG. 7. For brevity, details are not described herein again.

Figure 11:
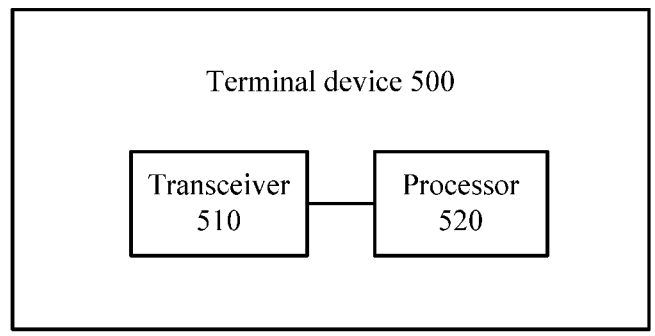
FIG. 11 is a schematic block diagram of a terminal device according to an embodiment of this application.

FIG. 11 is a schematic block diagram of a terminal device 500 according to an embodiment of this application. As shown in FIG. 11, the terminal device 500 includes:

a transceiver 510, configured to receive a discovery message sent by a first terminal device, where the discovery message is used to indicate that the first terminal device is to be handed over from a first network device to a second network device; and a processor 520, configured to generate a second handover request based on the discovery message, and send the second handover request to the first terminal device, where the second handover request includes identification information of the second terminal device, and the identification information of the second terminal device is used by the first terminal device to hand over the first terminal device and the at least one second terminal device from the first network device to the second network device.

Optionally, the transceiver 510 is further configured to receive a feedback message sent by the first terminal device, where the feedback message is used to indicate whether the second handover request is accepted.

In this embodiment of the present invention, optionally, the transceiver 510 is further configured to receive second handover indication information sent by the first terminal device, where the second handover indication information includes configuration information of the at least one second terminal device;

the transceiver 510 is further configured to send a second random access request to the second network device based on the configuration information of the at least one second terminal device; and the transceiver 510 is further configured to receive a second random access response sent by the second network device, where the second random access response includes an uplink timing advance of the second terminal device.

Optionally, the second handover indication information further includes uplink resource allocation information of the second terminal device; or the second random access response further includes uplink resource allocation information of the second terminal device.

Optionally, the transceiver 510 is further configured to receive second handover indication information sent by the first terminal device, where the second handover indication information includes configuration information of the at least one second terminal device, and uplink resource allocation information and a first uplink timing advance of the second terminal device, and the first uplink timing advance is used by the second terminal device to send an uplink signal.

It is understood that the terminal device 500 in this embodiment of this application may be corresponding to the second terminal device in the embodiments of this application, and the foregoing and other operations and/or functions of the modules in the terminal device 500 are intended to implement corresponding processes in the methods of FIG. 2 to FIG. 7. For brevity, details are not described herein again.

Figure 12:
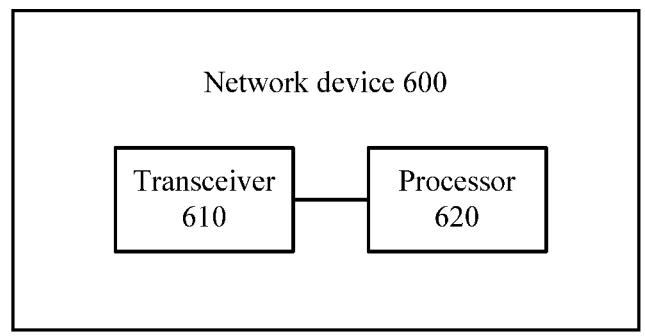
FIG. 12 is a schematic block diagram of a network device according to an embodiment of this application.

FIG. 12 is a schematic block diagram of a network device 600 according to an embodiment of this application. As shown in FIG. 12, the network device 600 includes:

a transceiver 610, configured to receive first handover assistance information sent by a first terminal device, where the first handover assistance information includes identification information of the first terminal device and identification information of at least one second terminal device; and a processor 620, configured to generate a third handover request message based on the first handover assistance information, and send the third handover request message to a second network device, where the third handover request message includes the identification information and context information of the first terminal device and the at least one second terminal device.

The transceiver 610 is further configured to receive a handover request response message sent by the second network device, where the handover request response message includes configuration information of the first terminal device and the at least one second terminal device.

The processor 620 is further configured to generate first handover indication information, and send the first handover indication information to the first terminal device, where the first handover indication information includes the configuration information of the first terminal device and the at least one second terminal device, and the first handover indication information is used for handing over the first terminal device and the at least one second terminal device from the first network device to the second network device.

Optionally, the handover request response message and the first handover indication information further include uplink resource allocation information of the first terminal device and the at least one second terminal device.

It is understood that the network device 600 may be corresponding to the network device in the methods, and may have any function of the network device in the methods.

It is understood that the network device 600 in this embodiment of this application may be corresponding to the first network device in the embodiments of this application, and the foregoing and other operations and/or functions of the modules in the network device 600 are intended to implement corresponding processes in the methods of FIG. 2 to FIG. 7. For brevity, details are not described herein again.

Figure 13:
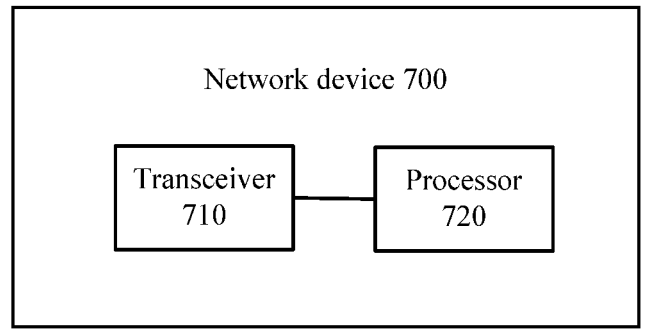
FIG. 13 is a schematic block diagram of a network device according to an embodiment of this application.

FIG. 13 is a schematic block diagram of a network device 700 according to an embodiment of this application. As shown in FIG. 13, the network device 700 includes:

a transceiver 710, configured to receive a third handover request message sent by a first network device, where the third handover request message includes identification information and context information of a first terminal device and at least one second terminal device; and a processor 720, configured to generate a handover request response message, and send the handover request response message to the first network device, where the handover request response message includes configuration information of the first terminal device and the at least one second terminal device, and the handover request response message is used for handing over the first terminal device and the at least one second terminal device from the first network device to the second network device.

Optionally, the transceiver 710 is further configured to receive a first random access request sent by the first terminal device; and the processor 720 is further configured to generate a first random access response, and send the first random access response to the first terminal device, where the first random access response includes a first uplink timing advance, and the first uplink timing advance is used by the first terminal device and the at least one second terminal device to send uplink signals.

Optionally, the handover request response message further includes uplink resource allocation information of the first terminal device and the at least one second terminal device, or the first random access response further includes uplink resource allocation information of the first terminal device and the at least one second terminal device.

Optionally, the transceiver 710 is further configured to receive a first random access request sent by the first terminal device;

the processor 720 is further configured to generate a first random access response, and send the first random access response to the first terminal device, where the first random access response includes an uplink timing advance of the first terminal device;

the transceiver 710 is further configured to receive a second random access request sent by the at least one second terminal device; and the processor 720 is further configured to generate a second random access response, and send the second random access response to the at least one second terminal device, where the second random access response includes an uplink timing advance of the at least one second terminal device.

Optionally, the handover request response message further includes uplink resource allocation information of the first terminal device and the at least one second terminal device; or the first random access response further includes uplink resource allocation information of the first terminal device, and the second random access response further includes uplink resource allocation information of the at least one second terminal device.

It is understood that the network device 700 may be corresponding to the network device in the methods, and may have any function of the network device in the methods.

An embodiment of this application further includes a communications system, including the network device in the foregoing network device embodiments and the terminal device in the foregoing terminal device embodiments.

It is understood that the network device 700 in this embodiment of this application may be corresponding to the second network device in the embodiments of this application, and the foregoing and other operations and/or functions of the modules in the network device 700 are intended to implement corresponding processes in the methods of FIG. 2 to FIG. 7. For brevity, details are not described herein again.

Figure 14:
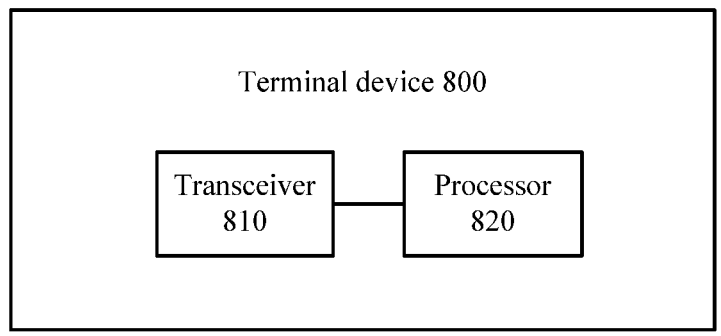
FIG. 14 is a schematic block diagram of a terminal device according to an embodiment of this application.

FIG. 14 is a schematic block diagram of a terminal device 800 according to an embodiment of this application. As shown in FIG. 14, the terminal device 800 includes:

a transceiver 810, configured to obtain first identification information, where the first identification information includes identification information of at least one second terminal device that needs to perform a tracking area update, and the second terminal device needs to perform the tracking area update;

a processor 820, configured to perform the tracking area update for the first terminal device and the at least one second terminal device based on the first identification information, where the tracking area update is changing from a first tracking area to a second tracking area.

Optionally, the transceiver 810 is configured to:
send a discovery message, where the discovery message is used to indicate that the first terminal device prepares to perform the tracking area update; and
receive a tracking area update request message sent by the at least one second terminal device, where the tracking area update request message includes the identification information of the at least one second terminal device.

Optionally, the processor 820 is configured to:
control the transceiver 810 to send a first update request message to a network side, where the first update request message includes identification information of the first terminal device and the identification information of the at least one second terminal device, and the first update request message is used by the network side to perform the tracking area update for the first terminal device and the at least one second terminal device;
control the transceiver 810 to receive a first acknowledgement message sent by the network side, where the first acknowledgement message includes an identity of the second tracking area; and
control the transceiver 810 to send a second acknowledgement message to the at least one second terminal device, where the second acknowledgement message includes the identity of the second tracking area.

It is understood that the terminal device 800 in this embodiment of this application may be corresponding to a terminal device that performs a tracking area update in the embodiments of this application, and the foregoing and other operations and/or functions of the modules in the terminal device 800 are intended to implement corresponding processes in the methods of FIG. 8 and FIG. 9A and FIG. 9B. For brevity, details are not described herein again.

Figure 15:
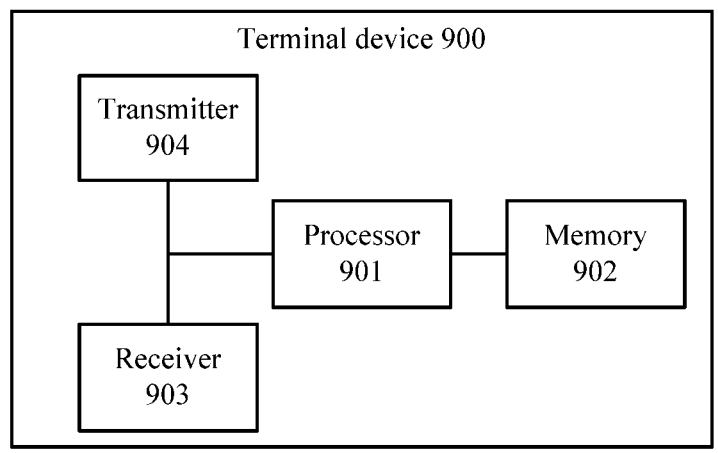
FIG. 15 is a schematic structural diagram of a terminal device according to an embodiment of this application.

FIG. 15 is a schematic structural diagram of a terminal device 900 according to an embodiment of this application. As shown in FIG. 15, the terminal device 900 includes a processor 901, a memory 902, a receiver 903, and a transmitter 904. These components are in a communications connection. The memory 902 is configured to store an instruction. The processor 901 is configured to execute the instruction stored in the memory 902, control the receiver 903 to receive information, and control the transmitter 904 to send information.

The processor 901 is configured to execute the instruction stored in the memory 902, to perform operations in a corresponding method in the embodiments of this application.

Figure 16:
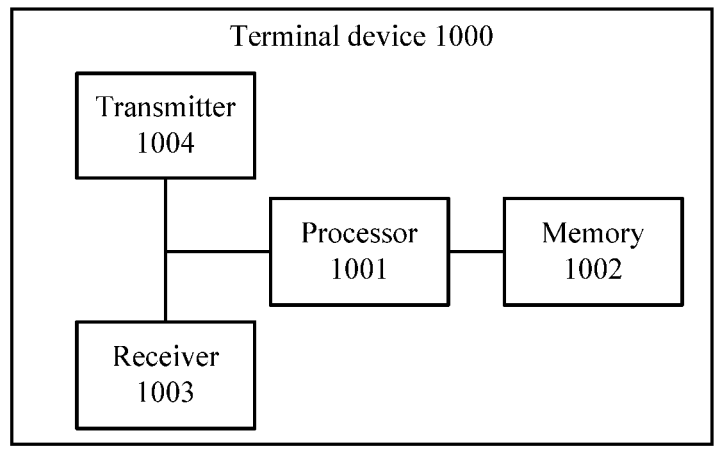
FIG. 16 is a schematic structural diagram of a terminal device according to an embodiment of this application.

FIG. 16 is a schematic structural diagram of a terminal device 1000 according to an embodiment of this application. As shown in FIG. 16, the terminal device 1000 includes a processor 1001, a memory 1002, a receiver 1003, and a transmitter 1004. These components are in a communications connection. The memory 1002 is configured to store an instruction. The processor 1001 is configured to execute the instruction stored in the memory 1002, control the receiver 1003 to receive information, and control the transmitter 1004 to send information.

The processor 1001 is configured to execute the instruction stored in the memory 1002, to perform operations in a corresponding method in the embodiments of this application.

Figure 17:
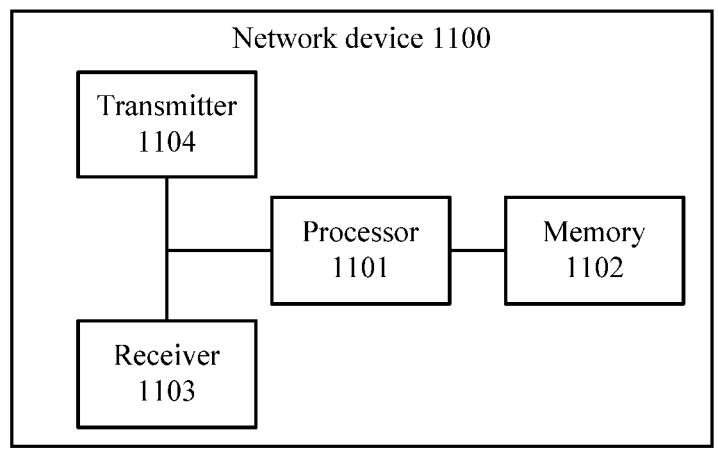
FIG. 17 is a schematic structural diagram of a network device according to an embodiment of this application.

FIG. 17 is a schematic structural diagram of a network device 1100 according to an embodiment of this application. As shown in FIG. 17, the network device 1100 includes a processor 1101, a memory 1102, a receiver 1103, and a transmitter 1104. These components are in a communications connection. The memory 1102 is configured to store an instruction. The processor 1101 is configured to execute the instruction stored in the memory 1102, control the receiver 1103 to receive information, and control the transmitter 1104 to send information.

The processor 1101 is configured to execute the instruction stored in the memory 1102, to perform operations in a corresponding method in the embodiments of this application.

Figure 18:
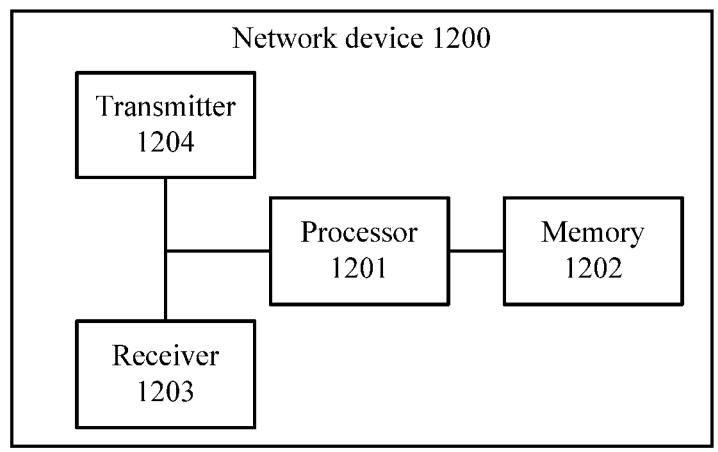
FIG. 18 is a schematic structural diagram of a network device according to an embodiment of this application.

FIG. 18 is a schematic structural diagram of a network device 1200 according to an embodiment of this application. As shown in FIG. 18, the network device 1200 includes a processor 1201, a memory 1202, a receiver 1203, and a transmitter 1204. These components are in a communications connection. The memory 1202 is configured to store an instruction. The processor 1201 is configured to execute the instruction stored in the memory 1202, control the receiver 1203 to receive information, and control the transmitter 1204 to send information.

The processor 1201 is configured to execute the instruction stored in the memory 1202, to perform operations in a corresponding method in the embodiments of this application.

Figure 19:
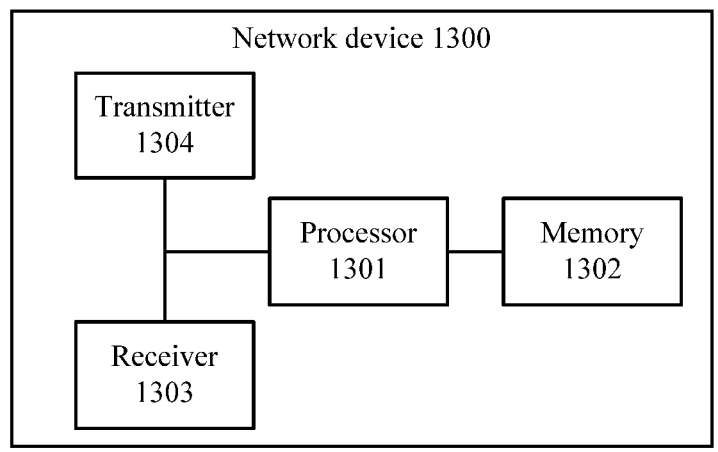
FIG. 19 is a schematic structural diagram of a terminal device according to an embodiment of this application.

FIG. 19 is a schematic structural diagram of a network device 1300 according to an embodiment of this application. As shown in FIG. 19, the network device 1300 includes a processor 1301, a memory 1302, a receiver 1303, and a transmitter 1304. These components are in a communications connection. The memory 1302 is configured to store an instruction. The processor 1301 is configured to execute the instruction stored in the memory 1302, control the receiver 1303 to receive information, and control the transmitter 1304 to send information.

The processor 1301 is configured to execute the instruction stored in the memory 1302, to perform operations in a corresponding method in the embodiments of this application. In the embodiments of this application, the processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

The memory may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache.

The bus system may further include a first power bus, a control bus, a status signal bus, and the like, in addition to a data bus. For ease of representation, only one bold line is used to represent the bus in the figure, but this does not mean that there is only one bus or only one type of bus.

An embodiment of this application provides a computer readable medium, configured to store a computer program. The computer program includes communication methods used to perform the embodiments of this application in FIG. 2 to FIG. 9B. The readable medium may be a ROM or a RAM. This is not limited in the embodiments of this application.

A person of ordinary skill in the art may be aware that, with reference to the examples described in the embodiments disclosed in this specification, units and algorithm operations may be implemented by electronic hardware, computer software, or a combination thereof. To clearly describe interchangeability between the hardware and the software, the foregoing has generally described compositions and operations of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a detailed working process of the foregoing system, apparatus, and unit, reference may be made to a corresponding process in the foregoing method embodiments, and details are not described herein again.

In the several embodiments provided in this application, it is understood that the disclosed system, apparatus, and method may be implemented in other manners. For example, the described apparatus embodiments are merely examples. For example, the unit division is merely logical function division and may be other division in actual implementation.

For example, a plurality of units or components may be combined or integrated into another system, or some features may be ignored or may not be performed. In addition, the shown or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions in the embodiments of this application.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the operations of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A handover method, comprising:
    obtaining, by a first terminal device, first identification information, wherein the first identification information comprises identification information of at least one second terminal device; and
    performing, by the first terminal device, handover of the first terminal device and the at least one second terminal device based on the first identification information, wherein the handover is handover from a first network device to a second network device, wherein performing the handover, comprises:
        sending, by the first terminal device, first handover assistance information to the first network device, wherein the first handover assistance information comprises identification information of the first terminal device and the identification information of the at least one second terminal device;
        receiving, by the first terminal device, first handover indication information sent by the first network device, wherein the first handover indication information comprises configuration information of the first terminal device and configuration information of the at least one second terminal device; and performing, by the first terminal device, handover from the first network device to the second network device based on the first handover indication information, and assisting, based on the first handover indication information, in handing over the at least one second terminal device from the first network device to the second network device, including sending, by the first terminal device, a first random access request to the second network device based on the configuration information of the first terminal device; and receiving, by the first terminal device, a first random access response sent by the second network device, wherein the first random access response comprises a first uplink timing advance, and the first uplink timing advance is used by the first terminal device and the at least one second terminal device to send uplink signals for use in the handover.

2. The method according to claim 1, wherein the performing, by the first terminal device, handover from the first network device to the second network device based on the first handover indication information, and assisting, based on the first handover indication information, in handing over the at least one second terminal device from the first network device to the second network device further comprises:

sending, by the first terminal device, second handover indication information to the at least one second terminal device, wherein the second handover indication information comprises the first uplink timing advance and the configuration information of the at least one second terminal device.

3. The method according to claim 2, wherein the first handover indication information further comprises uplink resource allocation information of the first terminal device and the at least one second terminal device, or the first random access response further comprises uplink resource allocation information of the first terminal device and the at least one second terminal device; and the second handover indication information further comprises uplink resource allocation information of the at least one second terminal device.

4. The method according to claim 1, wherein the performing, by the first terminal device, handover from the first network device to the second network device based on the first handover indication information, and assisting, based on the first handover indication information, in handing over the at least one second terminal device from the first network device to the second network device comprises:

sending, by the first terminal device, second handover indication information to the at least one second terminal device, wherein the second handover indication information comprises the configuration information of the at least one second terminal device, and the configuration information of the at least one second terminal device is used by the at least one second terminal device to send a second random access request to the second network device.

5. The method according to claim 4, wherein the first handover indication information further comprises uplink resource allocation information of the first terminal device and the at least one second terminal device, and the second handover indication information further comprises uplink resource allocation information of the at least one second terminal device; or the first random access response further comprises uplink resource allocation information of the first terminal device, and an uplink timing advance and uplink resource allocation information of the at least one second terminal device are comprised in a second random access response sent by the second network device.

6. The method according to claim 1, wherein the performing, by the first terminal device, handover of the first terminal device and the at least one second terminal device based on the first identification information comprises:

performing, by the first terminal device, handover from the first network device to the second network device;

sending, by the first terminal device, a first handover request to the second network device, wherein the first handover request comprises the identification information of the at least one second terminal device;

receiving, by the first terminal device, third handover indication information sent by the second network device, wherein the third handover indication information comprises configuration information of the at least one second terminal device; and assisting, by the first terminal device based on the third handover indication information, in handing over the at least one second terminal device from the first network device to the second network device.

7. The method according to claim 6, wherein the third handover indication information further comprises uplink resource allocation information of the at least one second terminal device; and the assisting, by the first terminal device based on the third handover indication information, in handing over the at least one second terminal device from the first network device to the second network device comprises:

sending, by the first terminal device, second handover indication information to the at least one second terminal device, wherein the second handover indication information comprises the configuration information of the at least one second terminal device, the uplink resource allocation information of the at least one second terminal device, and an uplink timing advance of the first terminal device, and the uplink timing advance of the first terminal device is used by the at least one second terminal device to send an uplink signal.

8. The method according to claim 6, wherein the assisting, by the first terminal device based on the third handover indication information, in handing over the at least one second terminal device from the first network device to the second network device comprises:

sending, by the first terminal device, second handover indication information to the at least one second terminal device, wherein the second handover indication information comprises the configuration information of the at least one second terminal device, and the configuration information of the at least one second terminal device is used by the at least one second terminal device to send a second random access request to the second network device.

9. The method according to claim 8, wherein the third handover indication information further comprises uplink resource allocation information of the at least one second terminal device, and the second handover indication information further comprises the uplink resource allocation information of the at least one second terminal device; or an uplink timing advance and uplink resource allocation information of the at least one second terminal device are comprised in a second random access response sent by the second network device.

10. The method according to claim 6, wherein before the performing, by the first terminal device, handover from the first network device to the second network device, the method further comprises:
sending, by the first terminal device, first handover assistance information to the first network device, wherein the first handover assistance information comprises identification information of the first terminal device and the identification information of the at least one second terminal device, and the first handover assistance information is used to indicate that the first terminal device is to perform group handover.

11. The method according to claim 1, wherein the method further comprises:
receiving, by the first terminal device, group handover support indication information sent by the first network device, wherein the group handover support indication information is used to indicate that the first network device supports a group handover operation.

12. The method according to claim 1, wherein the obtaining, by a first terminal device, first identification information comprises:
sending, by the first terminal device, a discovery message, wherein the discovery message is used to indicate that the first terminal device is to be handed over; and
receiving, by the first terminal device, a second handover request sent by the at least one second terminal device, wherein the second handover request comprises the identification information of the at least one second terminal device.

13. A first terminal device, comprising:
a transceiver, configured to obtain first identification information, wherein the first identification information comprises identification information of at least one second terminal device; and
a processor, configured to hand over the first terminal device and the at least one second terminal device based on the first identification information, wherein the handover is handover from a first network device to a second network device, wherein the processor is configured to:
control the transceiver to send first handover assistance information to the first network device, wherein the first handover assistance information comprises identification information of the first terminal device and the identification information of the at least one second terminal device;
control the transceiver to receive first handover indication information sent by the first network device, wherein the first handover indication information comprises configuration information of the first terminal device and configuration information of the at least one second terminal device; and
perform handover from the first network device to the second network device based on the first handover indication information, and assist, based on the first handover indication information, in handing over the at least one second terminal device from the first network device to the second network device, including controlling the transceiver to send a first random access request to the second network device based on the configuration information of the first terminal device; and to control the transceiver to receive a first random access response sent by the second network device, wherein the first random access response comprises a first uplink timing advance, and the first uplink timing advance is used by the first terminal device and the at least one second terminal device to send uplink signals for use in the handover.

14. The terminal device according to claim 13, wherein the processor is further configured to:
control the transceiver to send second handover indication information to the at least one second terminal device, wherein the second handover indication information comprises the first uplink timing advance and the configuration information of the at least one second terminal device.

15. The terminal device according to claim 13, wherein the first handover indication information further comprises uplink resource allocation information of the first terminal device and the at least one second terminal device, or the first random access response further comprises uplink resource allocation information of the first terminal device and the at least one second terminal device; and
the second handover indication information further comprises uplink resource allocation information of the at least one second terminal device.

16. The terminal device according to claim 13, wherein the processor is specifically configured to:
control the transceiver to send second handover indication information to the at least one second terminal device, wherein the second handover indication information comprises the configuration information of the at least one second terminal device, and the configuration information of the second terminal device is used by the at least one second terminal device to send a second random access request to the second network device.

17. The terminal device according to claim 16, wherein the first handover indication information further comprises uplink resource allocation information of the first terminal device and the at least one second terminal device, and the second handover indication information further comprises uplink resource allocation information of the at least one second terminal device; or
the first random access response further comprises uplink resource allocation information of the first terminal device, and an uplink timing advance and uplink resource allocation information of the at least one second terminal device are comprised in a second random access response sent by the second network device.

18. A non-transitory computer readable storage medium having instructions stored thereon, which when executed by a processor, cause the processor to perform operations, the operations comprising:
obtaining, by a first terminal device, first identification information, wherein the first identification information comprises identification information of at least one second terminal device; and
performing, by the first terminal device, handover of the first terminal device and the at least one second terminal device based on the first identification information, wherein the handover is handover from a first network device to a second network device, wherein performing the handover, comprises:
sending, by the first terminal device, first handover assistance information to the first network device, wherein the first handover assistance information comprises identification information of the first terminal device and the identification information of the at least one second terminal device;

receiving, by the first terminal device, first handover indication information sent by the first network device, wherein the first handover indication information comprises configuration information of the first terminal device and configuration information of the at least one second terminal device; and performing, by the first terminal device, handover from the first network device to the second network device based on the first handover indication information, and assisting, based on the first handover indication information, in handing over the at least one second terminal device from the first network device to the second network device, including sending, by the first terminal device, a first random access request to the second network device based on the configuration information of the first terminal device; and receiving, by the first terminal device, a first random access response sent by the second network device, wherein the first random access response comprises a first uplink timing advance, and the first uplink timing advance is used by the first terminal device and the at least one second terminal device to send uplink signals for use in the handover.

* * * * *